United States Patent
Farr

(10) Patent No.: US 7,309,174 B2
(45) Date of Patent: Dec. 18, 2007

(54) INTEGRATED OPTICAL DEVICES AND METHODS OF MAKING SAME

(75) Inventor: Mina Farr, Palo Alto, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 11/116,639

(22) Filed: Apr. 28, 2005

(65) Prior Publication Data

US 2005/0185900 A1 Aug. 25, 2005

Related U.S. Application Data

(63) Continuation-in-part of application No. 11/040,483, filed on Jan. 21, 2005.

(60) Provisional application No. 60/577,035, filed on Jun. 4, 2004, provisional application No. 60/538,201, filed on Jan. 22, 2004.

(51) Int. Cl.
*G02B 6/36* (2006.01)

(52) U.S. Cl. .............................. 385/94; 385/53; 385/88; 385/92

(58) Field of Classification Search ................. 385/53, 385/88, 89, 92, 94
See application file for complete search history.

(56) References Cited

U.S. PATENT DOCUMENTS

| | | | | |
|---|---|---|---|---|
| 3,748,458 A | * | 7/1973 | Morrison et al. | 362/267 |
| 5,285,512 A | * | 2/1994 | Duncan et al. | 385/94 |
| 5,515,469 A | * | 5/1996 | Zarem et al. | 385/92 |
| 5,684,903 A | * | 11/1997 | Kyomasu et al. | 385/93 |
| 6,588,949 B1 | * | 7/2003 | Zhou | 385/94 |
| 2005/0036535 A1 | * | 2/2005 | Knopp et al. | 372/108 |

* cited by examiner

*Primary Examiner*—Jennifer Doan
(74) *Attorney, Agent, or Firm*—Workman Nydegger

(57) ABSTRACT

An optical subassembly is provided that includes an optical component mounted to a substrate. In addition, the optical subassembly includes a lens package having a lens that is optically coupled with the optical component. The lens package cooperates with the substrate to define a hermetic chamber within which the optical component is disposed. The optical subassembly can be made as an integrated subassembly having both transmit and receive components within the hermetic chamber. Methods in accordance with the present invention include techniques for producing hermetically sealed optical subassemblies in mass-production.

34 Claims, 15 Drawing Sheets

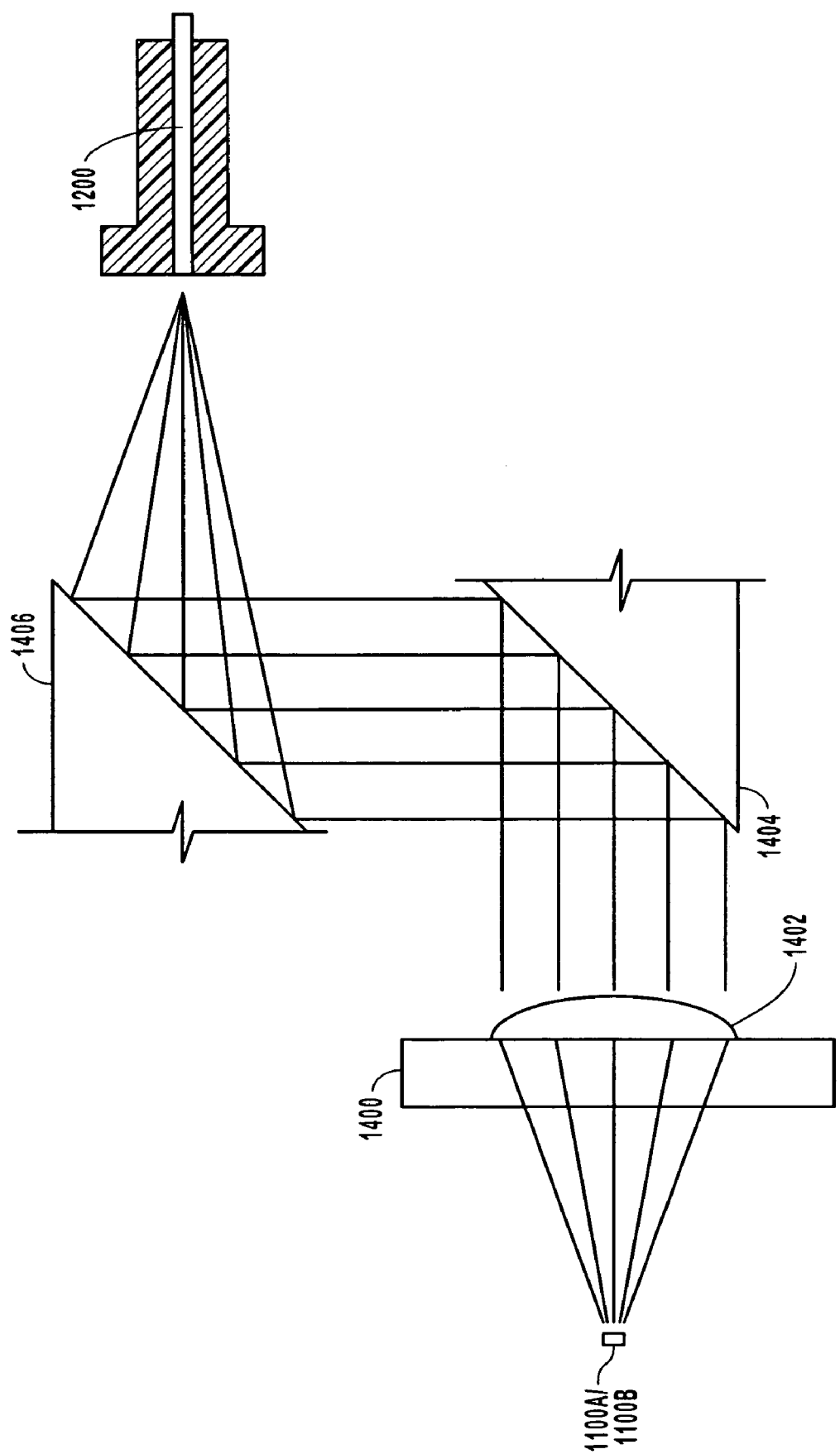

INTEGRATED OPTICAL DEVICES AND METHODS OF MAKING SAME

CROSS-REFERENCE TO RELATED APPLICATIONS

The present invention claims the benefit of priority to U.S. Provisional Patent Application No. 60/577,035, filed on Jun. 4, 2004, entitled "Integrated Optical Devices". The present invention is also a continuation-in-part of U.S. patent application Ser. No. 11/040,483, filed on Jan. 21, 2005, entitled "Hermetically Sealed Lasers and Methods of Manufacturing", which claims the benefit of priority to U.S. Provisional Patent Application No. 60/538,201, filed on Jan. 22, 2004, entitled "Hermetically-sealed Lasers and Methods of Manufacturing", and to U.S. Provisional Patent Application No. 60/577,035. Each of the foregoing patent applications are incorporated by reference herein in their respective entireties.

BACKGROUND OF THE INVENTION

1. The Field of the Invention

The present invention relates generally to optical subassemblies and associated components. More particularly, embodiments of the present invention concern an optical subassembly that includes a lens which facilitates the hermetic sealing of various components of the subassembly, while also implementing desired optical effects with respect to the optical signals transmitted and received by such optical components.

2. Background and Relevant Art

Transistor outlines, sometimes also referred to as a "TO" or "TO can," are widely employed in fiber optic applications. A typical TO can includes a header that is enclosed by a housing having a window at one end. In some cases, the window is part of the housing, while in other cases, the window is a separate component positioned within an opening defined by the housing. In either case, the housing and window cooperate with the header to define a hermetic enclosure.

An optical device such as a laser diode or photodiode is positioned on the header within the hermetic enclosure so as to be able to transmit or receive, respectively, an optical signal by way of the window. In addition, one or more lenses are sometimes provided that are interposed between the optical transmitter, or optical detector, and the window so as to impart various optical effects, such as collimation and focusing, to a received or transmitted optical signal. In some TO can geometry, a lens can be mounted in place of the window of the TO can, and can be positioned relative to the optical transmitter or receiver. In yet other cases, the TO can is configured so that the lens, or lenses, are disposed outside the TO can.

Typical TO cans are configured to be received in a receptacle defined in a connector port. Opposite the TO can, the connector port includes or defines a receptacle configured to receive a connector ferrule. The connector ferrule, in turn, carries an optical fiber such that when the connector ferrule is fully received within the receptacle defined by the connector port, the optical fiber is optically coupled with the window, lens(es) and laser of the TO can. In this way, optical signals transmitted by an optical transmitter in the TO can are directed out onto the optical fiber. Likewise, incoming optical signals received over the optical fiber are directed to the optical detector disposed within the TO can, through the lens(es) within the port.

While TO cans and their associated components provide useful functionality in many cases, the typical TO can possess certain characteristics which can make it unsuitable and/or undesirable for use in some applications. By way of example, the use of multiple components in the construction of the TO can complicates manufacturing processes and also contributes to the relatively high cost of typical TO cans. In addition, the use of multiple parts results in a relative increase in the number of potential failure points in the final assembly, especially during shock and vibration. These failures can also be amplified by the range of temperatures to which the optical port is typically subjected. For example, the different optical components mounted within the mechanical port structure may move with respect to each other during operation as the support structure expands at higher temperatures.

Further, the configuration of typical TO cans does not make the TO can well suited to high volume production techniques such as wafer scale manufacturing. While some components of the TO can, such as the laser, can be produced with wafer scale techniques, the other components of the TO can must be produced with more labor intensive and time consuming techniques, and the same is likewise true with respect to assembly of the TO can.

Another concern with many TO can configurations relates to the lens and window arrangement. In particular, while the lens implements desired optical effects with respect to received or transmitted optical signals, the window should be an optically neutral element. That is, the purpose of the window is simply to allow the passage of optical signals into, or out of, the TO can, and to cooperate with the housing to facilitate formation of a hermetic chamber or enclosure for the optical transmitter or optical detector.

However, while the window is intended to be optically neutral, it is generally the case that every optical element placed in the path of an optical signal has at least some effect on that optical signal. Thus, while the window of the TO can is not employed to implement any particular effect with respect to the optical signal, the inclusion of the window as an additional optical element in the optical path can nonetheless act to compromise the integrity of optical signals transmitted and received in connection with the operation of the TO can and associated components.

Another problem associated with the window of the TO can is that it can place a limitation on the minimum distance the lens or lenses could be placed with respect to the laser and the detector. Since the output of the beam from an edge emitting laser grows (diverges) over this distance, the TO window and the lense(s) need to have a large enough pupil or aperture in order to effectively transmit all the light. As such, this can result in a needed increase in the size of the optical port as well.

Other complications can occur, such as in the case where a lens is incorporated on the TO can in place of the lens, which can result in fairly complicated alignment schemes. For example, any alignment of the lens on the TO lens cap to the laser or the detector on the TO header may still be compromised when the TO can is hermetically sealed. Thus, manufacturers that produce TO cans with lenses already aligned will often charge as much as double the lens cost for the TO assembly.

In view of the foregoing, and other, problems in the art, what is needed are optical subassemblies suited for construction using wafer scale techniques or other suitable high volume, low cost production techniques. Further, the optical subassemblies should be constructed so that the number of components required to build the optical subassembly is minimized. As well, the optical subassemblies should provide for a relative reduction in the number of optical components present in the optical path. Finally, the optical subassemblies should be suited for use with a variety of optical transmitters and optical detectors.

BRIEF SUMMARY OF THE INVENTION

Embodiments of the present invention generally relate to optical subassemblies and associated components. More particularly, exemplary embodiments of the present invention concern an optical subassembly that includes a lens which facilitates the hermetic sealing of various components of the subassembly, while also implementing desired optical effects with respect to the optical signals transmitted and received by such optical components.

In one exemplary implementation, an optical subassembly such as a receive optical subassembly ("ROSA") or transmit optical subassembly ("TOSA"), is provided that includes a substrate that defines a cavity wherein an optical component, in some cases a semiconductor laser, at least partially resides. A monitor photodiode is located in the cavity and is optically coupled with the semiconductor laser. In addition, the optical subassembly includes a lens that is optically coupled with the semiconductor laser. Further, the lens is attached to, and cooperates with, the substrate to substantially define a hermetic chamber within which the semiconductor laser is disposed. Finally, a fiber port is attached to the lens so that an optical fiber carried by the fiber port can be optically coupled with the lens and the semiconductor laser.

Among other things then, exemplary embodiments of the invention eliminate the need for a TO can to house the semiconductor laser. Further, use of the lens both to implement desired optical effects and to hermetically seal the semiconductor laser reduces the number of components in the optical path of the semiconductor laser. In addition, wafer scale production of components such as the lens enables relatively rapid and inexpensive production of the optical subassembly.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6C is a ray diagram that indicates operational characteristics of an exemplary implementation of an optical subassembly such as that illustrated in FIG. 5B;

DETAILED DESCRIPTION OF THE PREFERRED EMBODIMENTS

Figure 1:
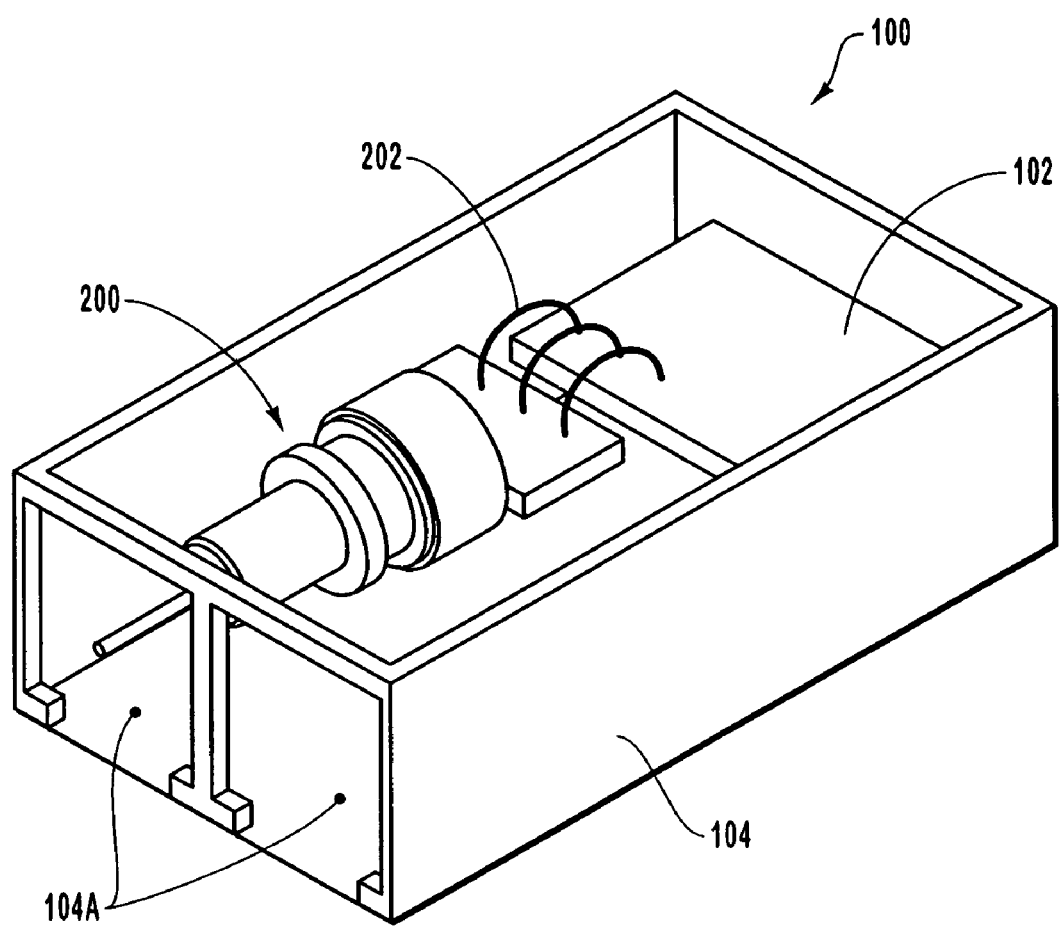
FIG. 1 is a perspective view of an exemplary optical module, such as an optical transceiver, that includes at least one optical subassembly.

The present invention extends to optical subassemblies and associated components. More particularly, exemplary embodiments of the present invention concern an optical subassembly that includes a lens which facilitates the hermetic sealing of various components of the subassembly, while also implementing desired optical effects with respect to the optical signals transmitted and received by such optical components.

I. General Characteristics of an Exemplary Optical Subassembly

As noted earlier, embodiments of the present invention concern an optical subassembly that includes a lens which facilitates the hermetic sealing of various components of the optical subassembly, while also implementing desired optical effects with respect to the optical signals transmitted and/or received by the optical subassembly.

More particularly, and as outlined in further detail below, exemplary embodiments of the optical subassembly include a substrate that defines a cavity or depression configured to receive optical components. Such receive optical components can include, but are not limited to, a monitor photodiode and an optical transmitter. Some examples of optical transmitters include vertical cavity surface emitting lasers ("VCSEL"), edge emitting lasers such as Fabry-Perot ("FP") lasers. Other components that may be used therewith include an optical turn mirror, or deflector, which can be used with an edge emitting laser. The optical components are hermetically sealed in the cavity by the cooperation of the substrate with a lens, implemented in some cases as an aspheric lens, that is soldered to the substrate. A fiber stop attached to the lens assembly is configured to carry a fiber that is arranged for optical communication with the semiconductor laser and the lens.

The resulting optical subassembly, which could take the form of either a transmit optical subassembly ("TOSA") or a receive optical subassembly ("ROSA"), can be employed in a variety of operating environments. In one exemplary case, the optical subassembly is an element of an optical transceiver. However, the scope of the invention is not so limited and embodiments of the optical subassembly may be employed in any other environment where the characteristics and functionality of the optical subassembly may prove useful.

Further, the particular types and combinations of optical components employed in exemplary optical subassemblies may be varied so that the optical subassembly can be tailored for particular applications. By way of example, optical subassemblies intended for use in long wave applications may employ an FP laser, rather than a VCSEL. Of course, any of a variety of other optical subassemblies can be devised and employed as well.

As well, different materials may be selected for components of the optical subassembly, based upon considerations such as the operating environment and intended application of the optical subassembly. For example, silicon may be used for components such as the lens when those components are intended for use in long wave applications.

II. Exemplary Operating Environments for an Optical Subassembly

Directing attention now to FIG. 1, details are provided concerning an exemplary operating environment 100 for an optical subassembly denoted generally at 200. In the illustrated embodiment, the optical subassembly 200 is implemented as either a ROSA or TOSA of an optical transceiver 100. In at least some implementations, the optical transceiver is configured to conform with any of a variety of standards, examples of which include, but are not limited to, XFP, SFP and SFF. Of course, embodiments of the optical transceiver 100 may be configured to conform with various other standards as well.

Typically, the optical transceiver 100 includes various other components as well. For example, the illustrated optical transceiver 100 includes one or more printed circuit boards 102 ("PCB") that include transceiver circuitry such as a laser driver, postamplifier, and other circuits, systems and components for use in the operation of the optical transceiver 100. The PCB 102 may include an edge connector (not shown) or other suitable device that implements an electrical and/or mechanical interface between the PCB 102 and a host device (not shown). In at least some cases, the optical subassembly 200 communicates with the PCB 102 circuitry by way of a flex circuit 202, or other suitable connector.

The optical subassembly 200, PCB 102, and flex circuit 202, among others, are substantially disposed within a housing 104 of the optical transceiver 100. In the illustrated implementation, the housing 104 includes a pair of connector ports 104A by way of which suitable optical connectors can be attached to the optical subassembly(ies) 200. In cases where the operating environment for the optical subassembly 200 is an optical transmitter or an optical detector, instead of an optical transceiver, only a single connector port is provided.

While the illustrated embodiment of the optical transceiver 100 provides for one or two optical subassemblies 200, the optical subassemblies 200 may be employed in greater numbers, and in different applications, as well. For example, optical components may be devised that employ an array of optical subassemblies 200, so that multiple optical fibers are coupled with corresponding optical subassemblies 200. Such arrays may be one or two dimensional and are suitable for use in a data link, among other things.

Further, arrays of optical subassemblies may be employed in multi-channel optical detectors and optical transmitters so that parallel data transmission or data reception can be performed. By way of example, a multi-channel optical detector employing an array of optical subassemblies 100, each of which includes an optical detector, could be connected downstream of an optical demultiplexer, so that each channel of the demultiplexer would be directed to a corresponding optical subassembly 100 of the receiver. In similar fashion, an array of optical subassemblies, each of which includes an optical transmitter, may be employed as well in a multi-channel optical transmitter device. As well, arrays of optical subassemblies may be employed in parallel or serial transmission configurations, depending upon the requirements of a particular application.

III. Optical Subassemblies

A. Transmit Subassemblies

Figure 2:
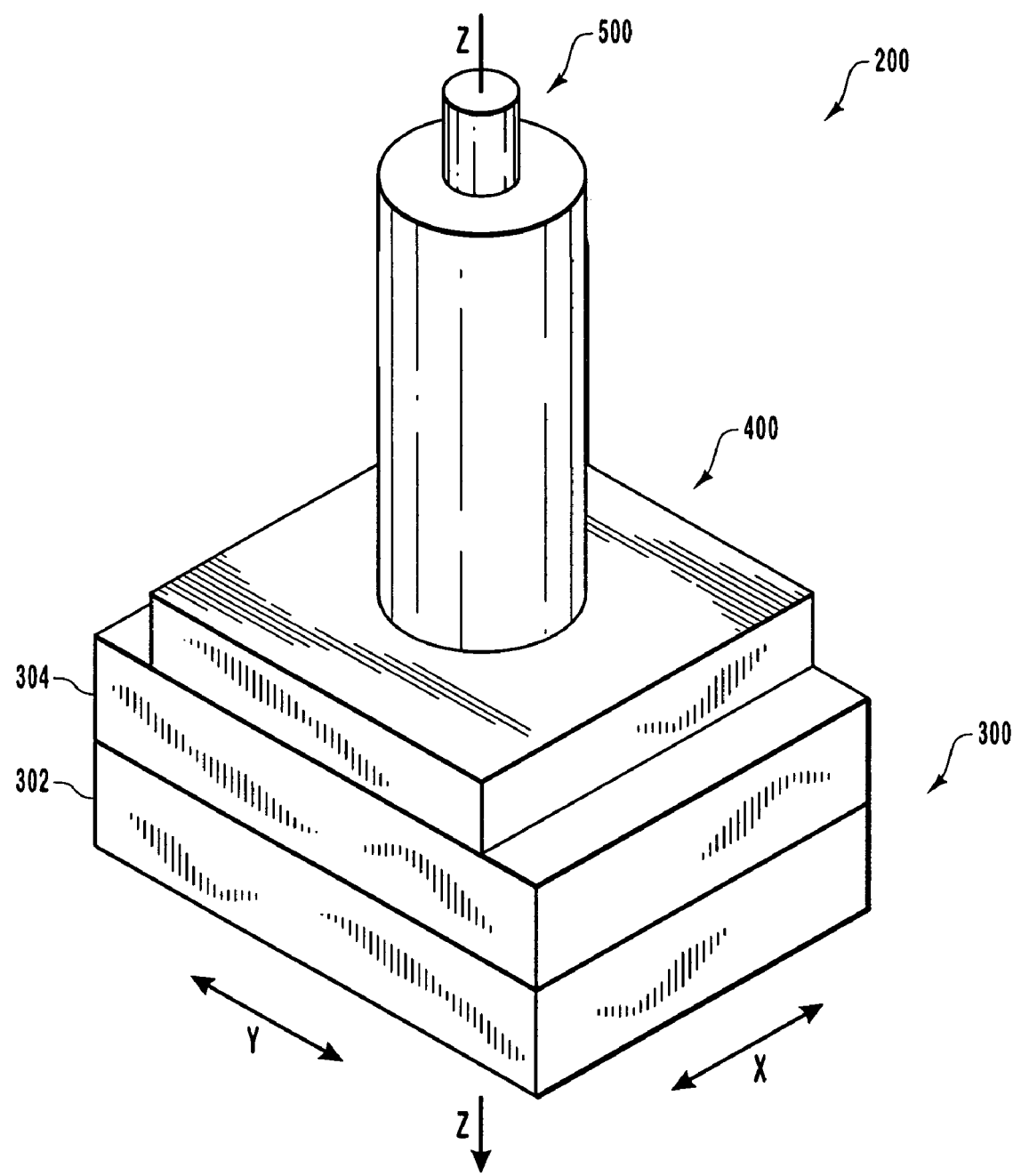
FIG. 2 is a perspective view of an exemplary implementation of an optical subassembly.
Figure 3:
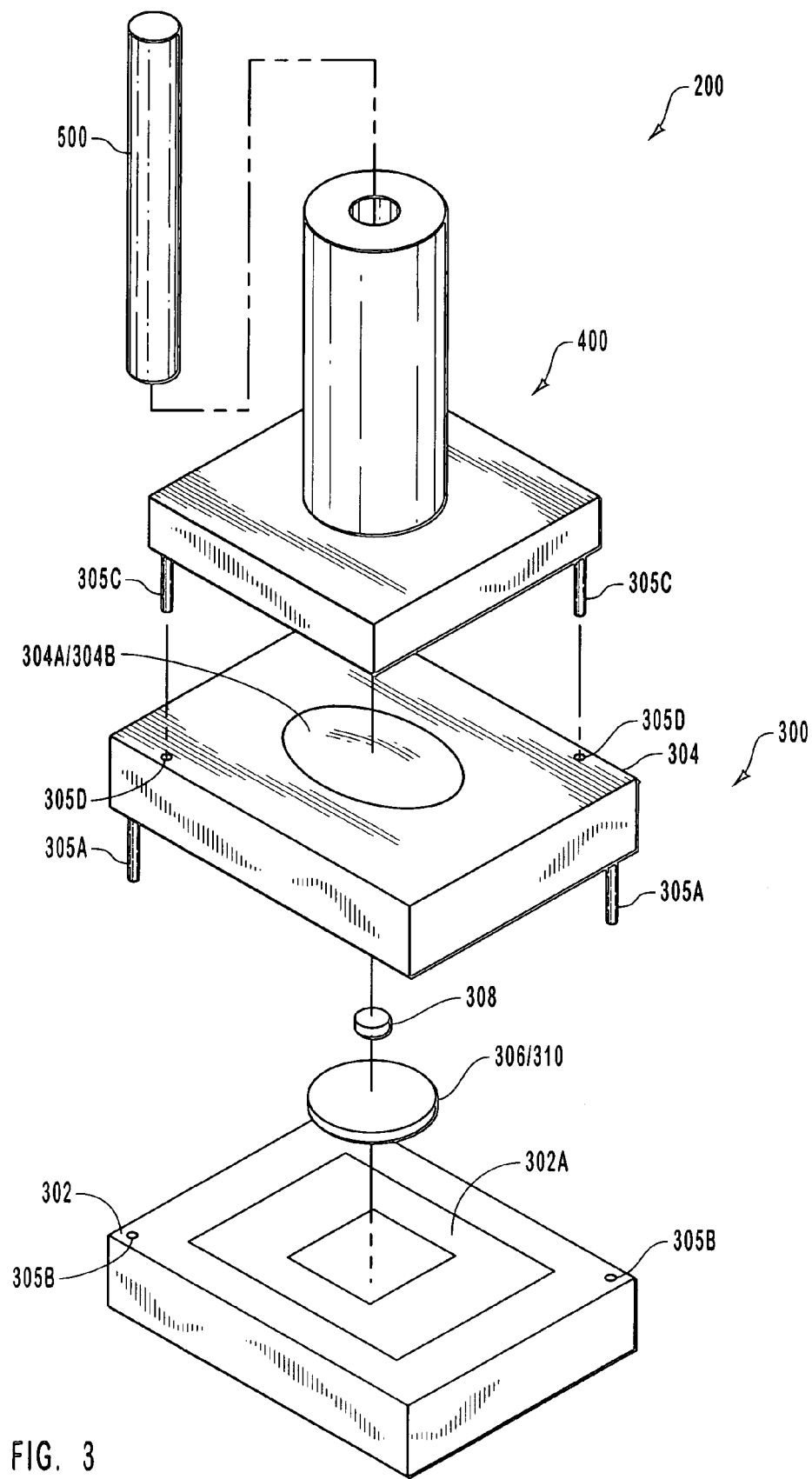
FIG. 3 is an exploded perspective view of the exemplary optical subassembly illustrated in FIG. 2, showing the relation between various components of the optical subassembly.

With attention now to FIGS. 2 and 3, further details are provided concerning the exemplary optical subassembly 200. Generally, the optical subassembly 200 includes an optical package 300 and a fiber port 400. In general, the optical package 300 includes a substrate 302 to which a lens package 304 is attached. As discussed in further detail below, the substrate 302 and lens package 304 cooperate to define a hermetic chamber wherein various optical components (not shown) are disposed. In addition, the lens package 304 includes or otherwise implements one or more lenses configured and arranged to implement various desired optical effects with respect to optical signals received and/or transmitted by way of the fiber port 400.

In this regard, the fiber port 400 is configured and arranged to carry a optical fiber 500 such that when the fiber port 400 is attached to the optical package 300 as indicated in FIG. 1, the optical fiber 500 is optically coupled with the lens(es), and other optical elements if any, of the lens package 304. The optical fiber 500 may be composed of glass, plastic, or any other suitable material(s). Further, the optical fiber 500 may be either a single mode fiber ("SMF") or multimode fiber ("MMF"), depending upon the particular application where the optical subassembly 200 is to be employed.

Various methods and materials may be used to attach and align the various subcomponents of the optical subassembly 200. With respect to the attachment of the lens package 304 to the substrate 302 for example, some embodiments of the optical subassembly are constructed using a metal solder process to attach the two components.

As a prelude to the attachment of the lens package 304 to the substrate 302, an active X-Y positioning step may be performed so that optical components residing on the substrate 302 are properly aligned in the X-Y plane with the lens(es) and other optical components, if any, of the lens package 304. Note, in this regard, that X-Y positioning refers to movement of optical components in planes that are substantially perpendicular to a longitudinal axis Z defined by the optical fiber 500 of the fiber port 400, as indicated in FIG. 2. Further, Z axis alignment refers to alignment processes and movement of optical components that occurs in a direction that is substantially parallel to a longitudinal axis defined by the optical fiber 500, also indicated in FIG. 2.

With continuing reference to FIG. 2, the fiber port 400 is attached to the optical package 300 and, specifically, the lens package 304, with epoxy or another suitable adhesive. Various other processes and/or materials may alternatively be employed in the assembly of the optical subassembly 200. Accordingly, the scope of the invention should not be construed to be limited to the exemplary processes and materials disclosed herein. It should be noted that the fiber port 400 can be configured so as to allow Z axis positioning of the received optical fiber 500 to the extent such a positioning may be necessary or desirable.

Some details will now be provided concerning some of the exemplary materials for elements of the optical subassembly 200. With regard first to the substrate 302, some exemplary substrate 302 materials include, but are not limited to, silicon or silicon-based materials. However, any other suitable materials may alternatively be employed. The use of silicon materials in the construction of the substrate 200 is particular useful in some instances since it enables the use of wafer scale production techniques in the processing and production of the substrate 302. In one exemplary embodiment, the silicon substrate 302 measures about 3 millimeters in size and less than 1 millimeter thick. In some cases, the substrate 302 takes a rectangular or square shape, but the scope of the invention is not limited to any particular substrate 302 geometry. More generally, the size and geometry of the substrate 302 may be selected as necessary to conform with the requirements of a particular application.

Turning now to the exemplary lens package 304 of the optical subassembly 200, various types of materials can be used in the construction of the lens package 304 and the associated lenses (not shown), and any other optical components included in the lens package 304. In at least some implementations, the lens package 304 and associated lenses are substantially made of some type of glass. Moreover, at least some implementations of the lens package 304 have dimensional attributes that are substantially the same as those of the substrate 302. However, this arrangement is not required. Rather, as in the case of the substrate 302, the geometry and dimensions of the lens package 304 may be selected as necessary to suit the requirements in particular application. For example, the lens package 304 may be round, square, rectangular, polygonal, or may take various other shapes. Accordingly, the scope of the invention is not limited to any particular lens package 304 configuration or dimensions.

As in the case of the lens package 304 and substrate 302, a variety of materials may be employed in the construction of the fiber port 400. In some exemplary embodiments, the fiber port 400 substantially compromises a plastic. However, any other suitable materials may be substituted. Further, in at least some implementations, the fiber port 400 compromises a plastic binned "fiber stop position" port. Other exemplary materials for the fiber port 400 include, but are not limited to, polytetraflouroethylene ("PTFE").

Figure 4:
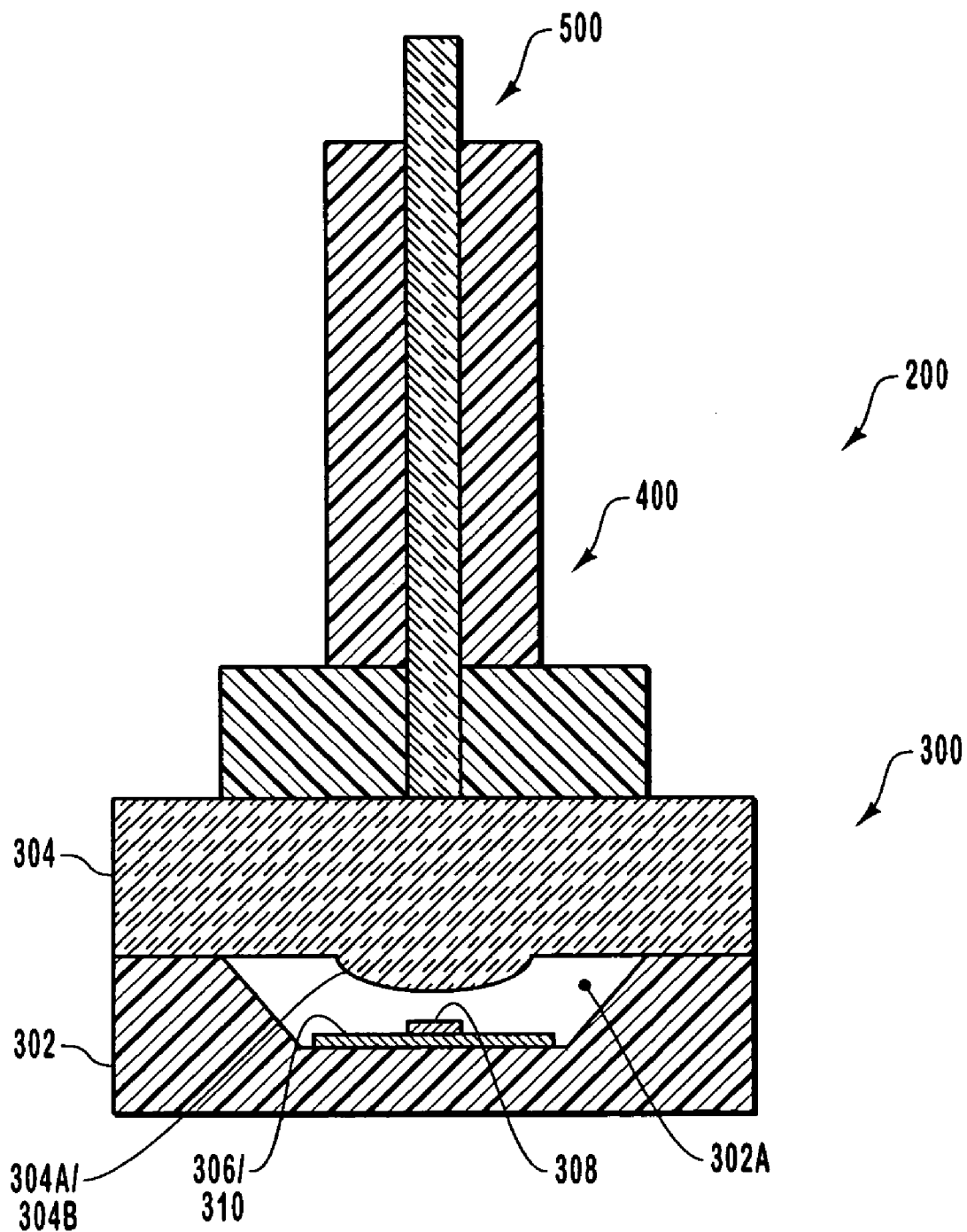
FIG. 4 is a section view that provides further details concerning the arrangement and relation of various components of an exemplary optical subassembly.

Directing attention now to FIGS. 3 and 4, and with continuing attention to FIG. 2, further details are provided concerning an exemplary implementation of the optical subassembly 200. As indicated in FIGS. 3 and 4, the substrate 302 defines a well 302A, wherein various optical components may be disposed. In the illustrated implementation, the well 302A is substantially rectangular in shape, and has a substantially trapezoidal cross section. However, the scope of the invention is not so limited.

Rather, aspects such as the size, geometry, location, orientation and positioning of the well 302A may be varied as necessary to suit the requirements of a particular application. Accordingly, the implementation of FIGS. 3 and 4 is presented for illustrative purposes only. In at least some cases, such aspects of the well 302A will be dictated at least in part by the nature of the particular optical components that are to be disposed in the well 302A as well as an ease of manufacturability of such well in the substrate 302.

Moreover, while the illustrated embodiment depicts a substrate 302 with only a single well 302A, the scope of the invention is not limited to such configurations. For example, some substrates may be configured with two or more wells sized, configured, located, and oriented as necessary to suit the requirements of a particular application.

In one embodiment, a silicon wafer is a preferred material for mature micro-machining processes for substrate 302, where the well 302A is made using preferential wet etching of silicon along its crystalline axis. The wet etch process for this material is typically a cheap and readily available process in many silicon process facilities. For parallel schemes where multiple wells (302A) are to be made on the same substrate 302, wet etched silicon wells can be made in a single process step with appropriate lithographic process locating the multiple well positions with respect to each other.

In some implementations, the substrate 302 and lens package 304 include complementary structures or structural elements that facilitate alignment and positioning of the substrate 302 and lens package 304 relative to each other. By way of example, the illustrated embodiment of the optical package 300 is configured such that the lens package 304 can include one or more alignment marks, such as marks 305A, configured to be co-aligned during the alignment process with the corresponding alignment marks 305B defined on the substrate 302. Such alignment marks comprise one exemplary structural implementation of a means for facilitating X-Y positioning. Any other functionally equivalent structure(s) may alternatively be employed, however.

In the illustrated embodiment, two optical components are provided that are substantially situated within the well 302A. In particular, a monitor photodiode ("MPD") 306 is provided that resides near the bottom of the well 302A. In addition, an optical transmitter 308, such as a vertical cavity surface emitting laser ("VCSEL"), is mounted atop the MPD 306, and is configured for communication with, for example, a laser driver, and/or other circuitry, by way of a suitable connector. The use of VCSELs in exemplary embodiments of the optical subassembly 200 is often desirable since VCSELs can be produced with relatively low-cost wafer scale production techniques, and thereby contribute to a relatively lower overall cost of the optical subassembly 100. As discussed below, however, other types of optical transmitters may be employed as well.

In the case of the illustrated embodiment, the MPD 306 is situated so as to receive a portion of the optical signal transmitted by the optical transmitter 308. In this way, the output power of the optical transmitter 308 can be determined. Of course, this functionality may be achieved as well with arrangements of the MPD 306 and optical transmitter 308 other than that shown in FIGS. 3 and 4.

It should be noted with respect to the optical transmitter 308, that the scope of the invention is not limited to solely to VCSELs. Rather, any of a variety of other types of optical transmitters may be employed. Examples of such optical transmitters include, but are not limited to, edge emitters such as Fabry-Perot ("FP") lasers. Further details concerning some exemplary embodiments of the optical subassembly 100 that include an FP laser are provided below.

With continuing attention to FIGS. 3 and 4, the exemplary lens package 304 includes an aspheric lens 304A that is optically coupled with the optical transmitter 308. Generally, an aspheric lens refers to any lens having a substantially non-spherical cross-section, and to portions of any such lenses. In at least some cases, the aspheric lens 304A is formed on the lens package 304 by etching or equivalent processes. The extent to which the lens 304A is aspheric, or deviates from a substantially spherical form, may be varied as necessary to suit the requirements of a particular application. Thus, some implementations of the aspheric lens 304A may represent a relatively minor departure from a spherical geometry, while other implementations of the aspheric lens 304A may significantly depart from a spherical geometry. Accordingly, the scope of the invention is not limited to any particular configuration or geometry of an aspheric lens.

Further details concerning the aspheric and other lenses that may be employed in connection with embodiments of the invention are provided below. In the illustrated embodiment however, the aspheric lens 304A is integral with the lens package 304 and implements a focusing functionality with respect to the optical signal emitted by the optical transmitter 308.

Aspheric lens are particularly useful in some applications. For example, aspheric lenses are well suited for use in connection with VCSELs having relatively wide emission patterns. For example, some VCSELs have emission patterns in the range of about 12 to about 15 microns wide. Among other things, aspheric lenses enable ready correction of optical aberrations associated with the VCSEL emission patterns, and provide relatively good focusing and collimating properties with respect to the optical signal transmitted by the VCSEL.

Of course, various additional or alternative lenses, such as substantially spherical lenses, and ball lenses, for example, may be employed as well in embodiments of the invention, depending upon such considerations as the optical effect desired to be achieve with respect to the optical signal generated by the optical transmitter 308, and the particular type of optical transmitter that is employed. Accordingly, the scope of the invention should not be construed to be limited solely to aspheric lenses or to combinations including aspheric lenses.

For example, as discussed in connection with FIGS. 7A through 7C below, at least some embodiments of the invention include a pair of lenses, one of which performs a focusing functionality while the other lens implements a collimating functionality. More generally then, the lens package 304 illustrated in FIGS. 3 and 4 represents but one exemplary implementation of a lens package such as may be employed in connection with embodiments of the invention.

In addition to imparting various optical effects with respect to a signal transmitted by the optical transmitter 308, the lens package 304 provides other functionality as well. In particular, and as collectively suggested in FIGS. 2 through 4, the lens package 304, when attached to the substrate 302, cooperates with the substrate 302 to hermetically seal the optical transmitter 308 and MPD 306 within the well 302A.

Note that, in some implementations, the chamber or enclosure thus defined, and equivalent structures, may be referred to herein simply as a "hermetic chamber." Thus, the lens package 304 integrates sealing functionality and optical signal modification functionality in a single element.

As the foregoing thus suggests, the optical package 300 combines many aspects of the functionality of a conventional TO can into a relatively small package that does not require a housing or a window. Because such a housing is neither employed nor required, the optical package 300 thus contributes to a reduction in the costs and complexity associated with conventional TO can type of assemblies. Further, incorporation of the aspheric lens 304A or other optical elements within the lens package 304 contributes to an overall reduction in the number of components disposed in the optical path of signals entering or leaving the optical subassembly 100. In this way, embodiments of the invention serve to attenuate the undesirable optical effects that might otherwise occur with respect to signals transmitted from or received by the optical subassembly 100.

As further illustrated in FIGS. 2 through 4, the exemplary optical subassembly 200 includes, as noted earlier, a fiber port 400 configured to receive an optical fiber 500. More particularly, the fiber port 400 carries and positions the optical fiber 500 such that the optical fiber 500 is optically coupled with the optical transmitter 308 when the fiber port 400 is attached to the optical package 300.

In some implementations, the lens package 304 and the fiber port 400 can include complementary structures or structural elements that facilitate alignment and positioning of the already hermetically-sealed lens and transmitter structure 302, 304, as well as the fiber port 400. By way of example, the illustrated embodiment of the optical package 200 is configured such that the fiber port 400 can include one or more protruding elements, such as posts 305C configured to be received within corresponding holes 305D defined in the lens package 304. Such ports and holes collectively comprise one exemplary structural implementation of a means for facilitating X-Y positioning between the fiber port and the transmitter subassembly. Any other functionally equivalent structure(s) may alternatively be employed, however.

B. Receive Subassemblies

As noted earlier, the scope of the invention is not limited to transmit optical subassemblies. In particular, at least some exemplary embodiments are directed as well to receive optical subassemblies.

Some exemplary receive optical subassemblies are assembled and configured as shown in FIGS. 2 through 4. However, in an exemplary receive optical subassembly, the MPD 306 of FIGS. 2 through 4 is replaced with an optical detector 310, such as a photodiode for example, and the optical transmitter 308 of FIGS. 2 through 4 is eliminated. The optical detector 310 is positioned within the well 302A so as to receive an optical signal by way of the lens package 304. As in the case of optical packages 300 employed in connection with embodiments of a transmit optical subassembly, the well 302A may be configured, located and oriented as necessary to suit the requirements of a particular optical detector and associated application(s).

In the case of the receive optical subassembly, the lens package 304 includes one or more lenses 304B configured and arranged to implement particular optical effects with respect to the incoming optical signal. The lenses 304B may include spherical or aspheric lenses, and may implement functions such as, but not limited to, focusing and collimation, with respect to the incoming optical signal.

C. Integrated Transceiver Subassemblies

As noted earlier, various combinations of optical subassemblies may be devised and employed as necessary to suit the requirements of a particular application. Optical devices including combinations of the optical subassemblies include data links, multi-channel optical detectors, and multi-channel optical transmitters, as well as optical transceivers such as illustrated in FIG. 1.

In yet other cases, a receive optical subassembly is combined together with a transmit optical subassembly to form an integrated optical transceiver that differs from the exemplary transceiver illustrated in FIG. 1 at least in that the integrated optical transceiver does not employ separate, discrete transmit and receive optical subassemblies.

Figure 5A:
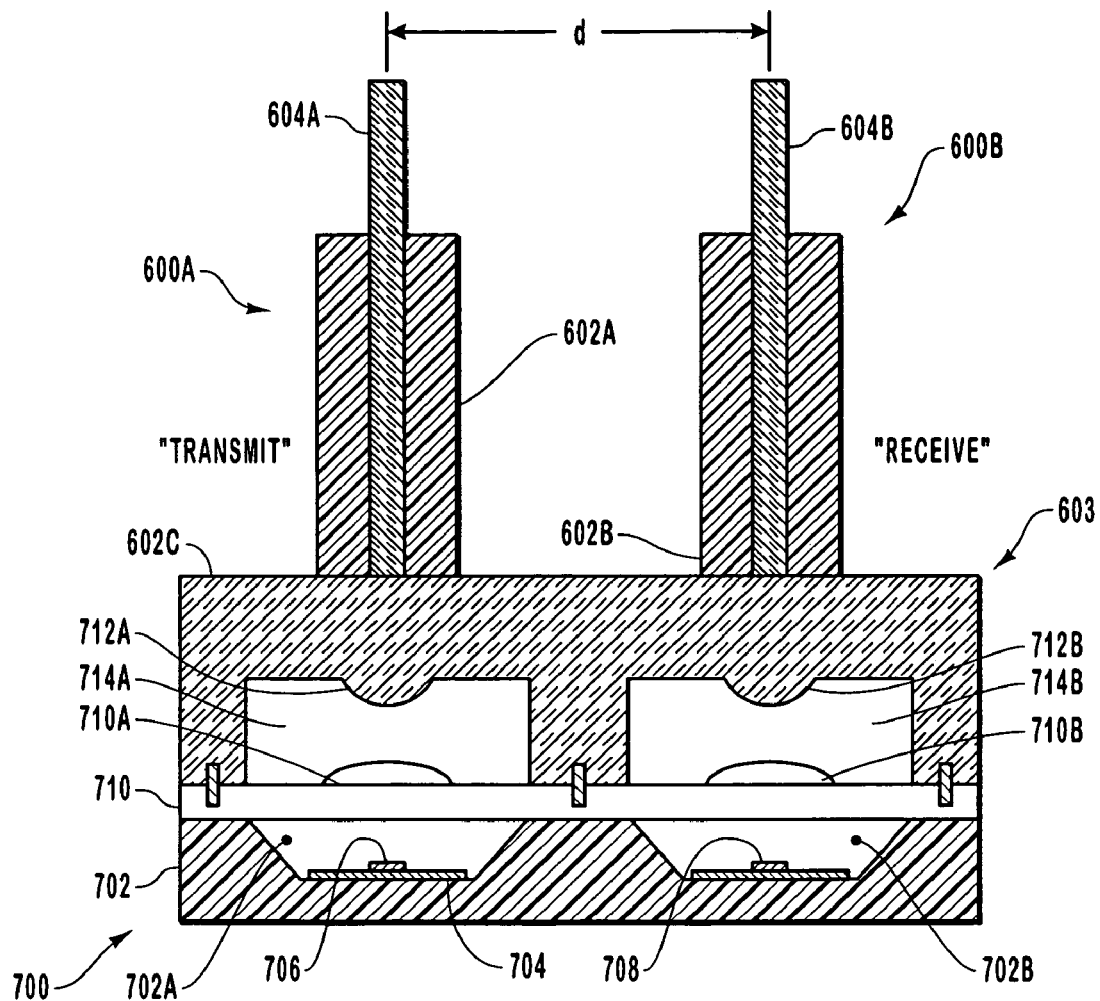
FIG. 5A is a section view of an exemplary integrated transceiver.
Figure 5B:
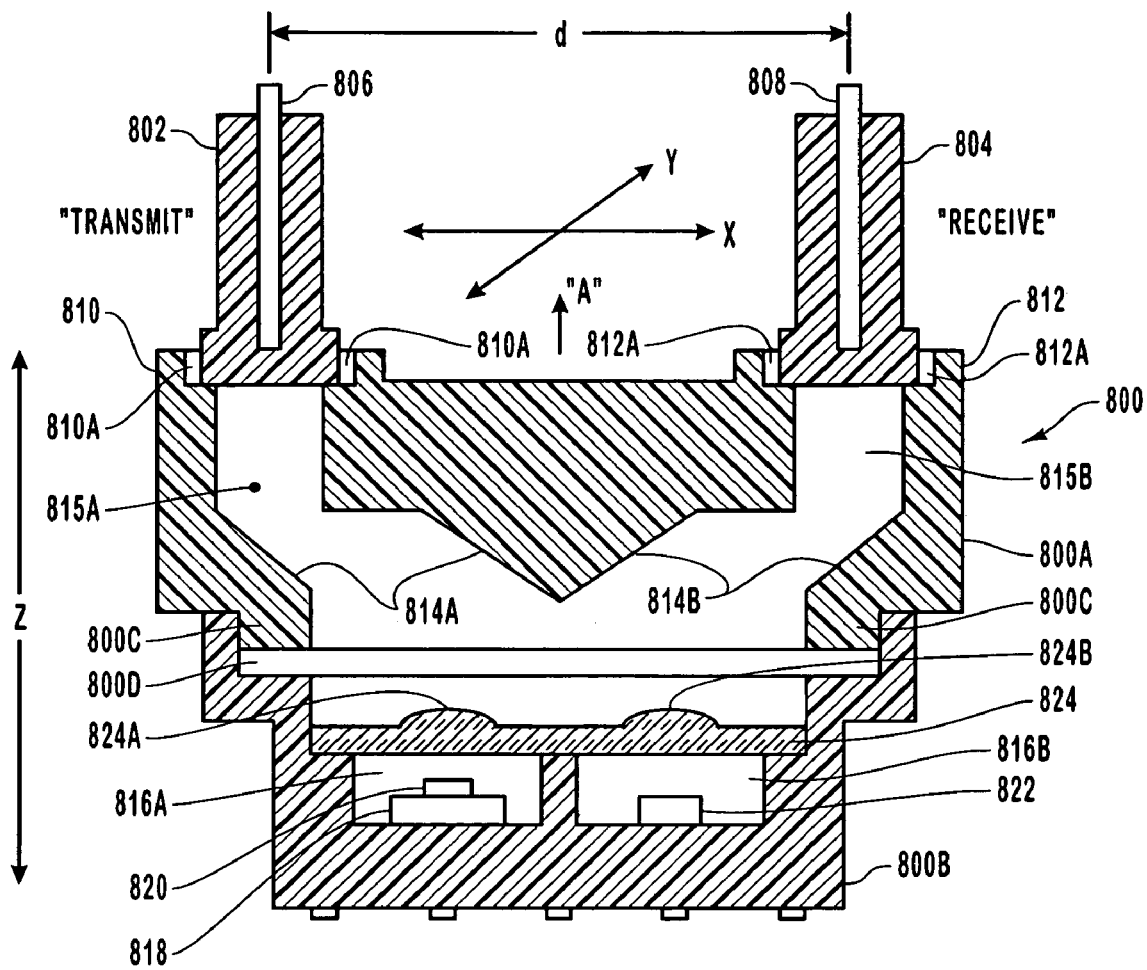
FIG. 5B is a section view of an alternative embodiment of an integrated transceiver, illustrating the use of mirrors to achieve a desired separation between the transmit and receive optical fibers.
Figure 5C:
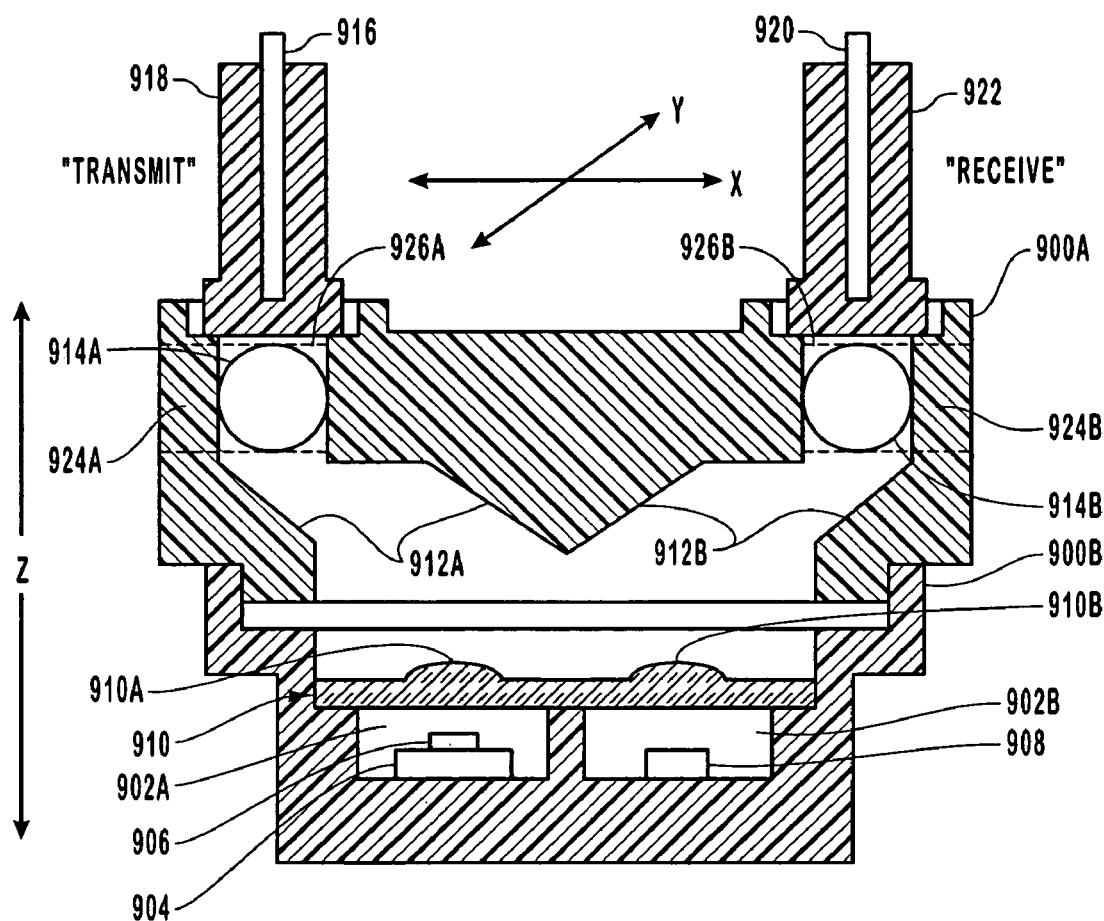
FIG. 5C is a section view of yet another alternative embodiment of an integrated transceiver.

Rather, in at least some of the exemplary implementations illustrated in FIGS. 5A through 5C, the optical transmit subassembly and optical receive subassembly share some common structural elements. Such arrangements simplify production processes and contribute to a relative reduction in the cost of the integrated transceiver. As well, the use of common structural elements reduces the number of potential failure points in the transceiver subassembly since relatively fewer structural connections are required.

Finally, while FIGS. 5A through 5C illustrate aspects of integrated optical transceiver subassemblies that include an optical transmit subassembly and an optical receive subassembly which share some common components, the optical transmit subassemblies and optical receive subassemblies illustrated in FIGS. 5A through 5C are not limited for use solely in that fashion. Rather, such optical transmit subassemblies and optical receive subassemblies may each be employed as separate, discrete optical subassemblies as well, similar to the optical subassemblies exemplified in FIGS. 2 through 4.

Directing particular attention now to FIG. 5A, details are provided concerning an exemplary implementation of an integrated transceiver, denoted generally at 600. In the illustrated embodiment, the integrated transceiver 600 includes an optical transmit subassembly 600A and an optical receive subassembly 600B that share portions of the optical package 700. In the illustrated embodiment for example, the optical package 700 includes a unitary substrate 702, which comprises a single piece of material that may be composed of glass, ceramic, silicon or other suitable materials.

The unitary substrate 702 defines a pair of wells 702A and 702B. Aspects of the wells 702A and 702B such as their geometry, size, orientation and location may be varied as necessary to suit the requirements of a particular application. Moreover, in some implementations, only a single well is provided, so that the optical emitter and optical detector both reside within the same well.

In some cases, various standards will play a role in the positioning of the wells 702A and 702B. For example, the SFP standard requires a certain minimum fiber-to-fiber centerline distance "d," so that the wells 702A and 702B must be arranged to accommodate this requirement. In some cases, such accommodation may involve little more than locating the wells 702A and 702B apart from each other a distance "d." In other cases, conformance with such requirements such as those specified by the SFP standards may necessitate the use of additional optical components, such as mirrors for example, in order that the distance "d" can be maintained (see, e.g., FIG. 5B).

With continuing reference now to FIG. 5A, an MPD 704 and optical transmitter 706 are disposed in the well 702A as shown, while an optical detector 708, such as a photodiode, is disposed in well 702B. Details concerning various exemplary components such as the aforementioned optical detector and optical transmitter are provided above in connection with the discussion of FIGS. 2 through 4.

The optical package 700 further includes a lens package 710 that, in one exemplary implementation, includes an aspheric collimating lens 710A and an aspheric focusing lens 710B. In the illustrated implementation, the aspheric collimating lens 710A is positioned and oriented to perform collimating functions with respect to optical signals emitted by the optical transmitter 706, while the aspheric focusing lens 710B is positioned and oriented to perform focusing functions with respect to received optical signals that are directed to the optical detector 708 (see, e.g., FIG. 7B).

The illustrated lens package 710 includes as well a focusing lens 712A and a collimating lens 712B. Generally, the focusing lens 712A focuses collimated light received from aspheric collimating lens 710A to the fiber port 602A and, particularly, into the optical fiber 604A, while the collimating lens 712B collimates light received by way of fiber port 602B and, particularly, from the optical fiber 604B, into the aspheric focusing lens 710B. In each case, the collimated light passes through the respective optical paths 714A and 714B cooperatively defined by the unitary fiber port 603 and the lens package 710.

In some implementations, one or both of the focusing lens 712A and a collimating lens 712B are spherical lenses, or lenses implemented as sections of a sphere. However, other shapes may be employed as well. For example, in other embodiments, a ball lens is used in place of one or both of focusing lens 712A and collimating lens 712B.

With more particular reference now to the fiber connections of the integrated transceiver 600, the fiber connections 602A and 602B, and unitary body 602C to which the fiber connections 602A and 602B are attached, cooperate to form a unitary SC or LC fiber port 603 that defines a fiber-to-fiber distance "d" consistent with an SC or LC connection, as applicable. In other cases, the fiber connections 602A and 602B are integral with the unitary body 602C.

In yet other implementations, the fiber connections 602A and 602B are not part of a unitary port but are implemented instead as discrete components attached to a unitary substrate. Further, the unitary fiber port 603 comprising the fiber connections 602A and 602B incorporates, in some implementations, one or both of the focusing lens 712A and the collimating lens 712B, such as in the body 602C. Thus, embodiments of the invention may include, in addition to a lens package having lenses and forming part of a hermetic chamber, various other lenses as well.

Directing attention now to FIG. 5B, details are provided concerning an alternative embodiment of an integrated transceiver, denoted generally at 800. The integrated transceiver 800 includes an upper housing 800A configured to mate with a lower housing 800B, each of which may be composed of materials including, but not limited to, plastic, silicon, and glass. In some implementations, the lower housing 800B is configured as a surface mount component. Among other things, embodiments of the upper and lower housings 800A and 800B, respectively, serve to house various optical and other components and to define various optical paths for signals entering the integrated transceiver 800 and/or originating from the integrated transceiver 800.

As discussed in further detail below, the upper housing 800A and lower housing 800B are configured so that, prior to final assembly of the integrated transceiver 800, the Z axis positions of the upper housing 800A and lower housing 800B, relative to each other, can be adjusted.

In addition to the upper housing 800A and lower housing 800B, the integrated transceiver 800 includes a pair of fiber ports 802 and 804, each of which is configured to carry a corresponding fiber 806 and 808, respectively. As discussed in further detail below, each of the fiber ports 802 and 804 is configured to mate with the upper housing 800A in such a way that the X-Y positioning of each fiber port 802 and 804, relative to the optical component(s), discussed below, disposed in the lower housing 800B can be adjusted prior to final assembly of the integrated transceiver 800.

With more particular reference now to the upper housing 800A, each of the fiber ports 802 and 804 is configured to be at least partially received within a corresponding receptacle 810 and 812 defined by the upper housing 800A. As indicated in FIG. 5B, each receptacle 810 and 812 has an inside diameter that is somewhat larger than the outside diameter of the received fiber port, so that gaps 810A and 812A are defined. The presence of the gaps 810A and 812A thus allows changes to the X-Y axes positioning of the corresponding fiber ports 802 and 804. Thus, the sizes and shapes of the receptacles 810 and 812, as well as the sizes and shapes of the fiber ports 802 and 804 are not limited to any particular configuration, but rather are selected so as to enable changes to the X-Y positioning of the fiber ports 802 and 804. Note that in at least some cases, the Z axis positioning of the upper and lower housing portions 800A and 800B is performed prior to the X-Y positioning of the fiber ports 802 and 804. This order may be reversed however and the X-Y positioning of the fiber ports 802 and 804 performed prior to Z axis positioning of the upper and lower housing portions 800A and 800B.

With continuing reference to the upper housing 800A, two pairs of mirrors 814A and 814B, respectively, are provided that serve to direct incoming and outgoing optical signals, and to implement various other optical effects as well. As indicated in FIG. 5B, the mirrors are positioned within optical paths 815A and 815B defined by the upper housing 800A. One or more of the mirrors 814A and 814B may be implemented as discrete components attached to the upper housing 800A or, alternatively, as light reflective interior surfaces of the upper housing 800A.

Aspects of the mirrors 814A and 814B such as, but not limited to, the positioning, number, orientation, location, reflectivity, and incidence and reflection angles may be varied as necessary to suit the requirements of a particular application. Moreover, one or both of the mirrors 814A and 814B, as well as other mirrors disclosed herein, may be implemented as substantially planar mirrors. Alternatively, one or more of such mirrors may be convex or concave, depending upon the optical effect desired to be achieved.

Among other things, the mirrors 814A and 814B enable the use of the integrated transceiver 800 in applications where physical constraints would otherwise prevent achievement of the fiber-to-fiber distance "d" mandated by a particular standard, such as the SFP standard for example. More particularly, the mirrors 814A and 814B enable redirection of optical signals to virtually any desired location, thus enabling the use of the integrated transceiver 800 in connection with a wide variety of different standards and protocols.

In the illustrated case, for example, the mirrors 814A serve to implement an X axis deflection on the optical signal generated by the optical transmitter 820, such that the optical signal is moved away from a central axis "A" of the integrated transceiver 900. In a similar fashion, the mirrors 814B serve to implement an X axis deflection on the optical signal received from the optical fiber 808 such that the optical signal is moved toward the central axis "A" of the integrated transceiver 900. Of course, these are exemplary effects implemented by an exemplary arrangement of mirrors, and various other mirror arrangements, and associated effects, may alternatively be employed.

With reference now to the lower housing 800B, a pair of wells 816A and 816B are defined that are configured and arranged to house various optical components. Further aspects of exemplary wells are disclosed elsewhere herein. In the illustrated embodiment, an MPD 818 and optical transmitter 820 reside in well 816A, while an optical detector 822 is disposed in well 816B. Various additional or alternative components may be employed depending upon the functionality desired.

The wells 816A and 816B are hermetically sealed or partially sealed by way of a lens package 824 that, in this exemplary implementation, includes a pair of aspheric lenses 824A and 824B. The lens package 822 may be composed of, for example, glass, silicon, or plastic (with or without a metal coating), or constructed as a compound structure, with individual parts made out of any of these or other materials. As disclosed elsewhere herein, the aspheric lens 824A performs a coupling function with respect to optical signals emitted by the optical transmitter 820, while the aspheric lens 824B performs a coupling function with respect to optical signals received from the optical fiber 808. The positioning and orientation of one or both of the aspheric lenses 824A and 824B may be varied as requirements dictate. Moreover, aspheric lenses need not be employed in every case and, more generally, other types of lenses, or combinations thereof, may be employed as necessary to achieve a desired effect.

It was noted above that the upper housing 800A and lower housing 800B are configured so that, prior to final assembly of the integrated transceiver 800, the Z axis positions of the upper housing 800A and lower housing 800B, relative to each other, can be adjusted. Typically, the Z axis positioning and/or X-Y positioning of various components of the integrated transceiver, or components of an optical subassembly such as illustrated in FIGS. 2 through 4 for example, is performed so as to facilitate achievement of desired optical effects with respect to the transmission, generation and/or modification of optical signals by components such as the MPD, optical detector, mirrors, lenses, fibers, and lasers, among others.

Accordingly, the exemplary upper housing 800A defines a necked portion 800C configured to be slidingly received in a socket 800D defined by the lower housing portion 800B. As a result of the interaction of the complementary structures 800C and 800D, the Z axis position of the upper housing 800A and lower housing 800B relative to each other can be adjusted simply by moving the upper housing 800A up or down in the socket 800D until a desired positioning is achieved. Additionally, or alternatively, the lower housing 800B may be moved relative to the upper housing 800A. In any case, once the desired positioning of the various components has been achieved, the components can then be joined together with epoxy or other suitable materials.

As suggested by the foregoing, and noted earlier in connection with the discussion of the posts 305A and holes 305B illustrated in FIG. 3, implementation of Z axis and/or X-Y axis alignment can be achieved with a wide variety of structural elements, configurations, and arrangements. Another example of such structural elements, configurations and arrangements is the gaps 810A and 812A which are sized to be somewhat larger than fiber ports 802 and 804, and which thereby facilitate X-Y positioning. Similarly, the necked portion 800C and socket 800D collectively comprise but one exemplary structural implementation of a means for facilitating Z axis alignment.

Moreover, such means for facilitating X-Y positioning, as well as means for facilitating Z axis alignment are not constrained for use solely with the integrated transceiver 800. Rather, either or both of such means may be employed as well in connection with separate, discrete optical subassemblies as well, such as the optical subassemblies exemplified in FIGS. 2 through 4. As well, some embodiments of the invention provide for both X-Y positioning as well as Z axis positioning, while yet other embodiments provide only for X-Y positioning, and only Z axis positioning. Finally, adjustments to X-Y positioning and Z axis positioning can be implemented with respect to other components besides fiber ports 802 and 804, and upper and lower housing portions 800A and 800B, depending upon the requirements of a particular application. Accordingly, the scope of the invention should not be construed to be limited to the disclosed exemplary implementations.

With attention now to FIG. 5C, details are provided concerning yet another alternative embodiment of an integrated transceiver, denoted generally at 900. As the integrated transceiver 900 illustrated in FIG. 5C is similar in many regards to the exemplary integrated transceiver 800 illustrated in FIG. 5B, the following discussion will focus primarily on selected aspects of the integrated transceiver 900.

Similar to the integrated transceiver 800, the integrated transceiver 900 is implemented as a two part housing that includes upper and lower housings 900A and 900B, respectively, wherein the lower housing 900A defines a pair of wells 902A and 902B wherein optical components such as an MPD 904, optical transmitter 906, and optical detector 908 are disposed. The wells 902A and 902B are hermetically sealed by a lens package 910 that includes a pair of lenses 910A and 910B configured for optical communication with, respectively, the optical transmitter 906 and optical detector 908. In some implementations, one or both of the lenses 910A and 910B are aspheric lenses.

The upper housing 900A includes mirrors 912A and 912B, as well as a pair of ball lenses 914A and 914B. Thus arranged, ball lens 914A serves to focus an optical signal from the optical transmitter 906 into the fiber 916 carried by fiber port 918. The ball lens 914B on the other hand, focuses an optical signal from fiber 920, carried by fiber port 922, onto mirrors 912B. Aspects of the ball lenses 914A and 914B such as their respective size and positioning may be varied as necessary to suit a particular application. Further, some implementations of the integrated transceiver, or optical subassembly of an integrated transceiver, employ only a single ball lens, while other implementations employ two or more ball lenses.

As suggested in FIG. 5C, the upper housing 900A may be configured in a variety of ways so as to enable installation of the ball lenses 914A and 914B. For example, some embodiments of the upper housing 900A define optical paths 924A and 924B by way of which ball lenses 914A and 914B may be inserted and positioned. In other implementations, the upper housing 900A define optical paths 926A and 926B by way of which ball lenses 914A and 914B may be inserted and positioned. Various other configurations of the integrated transceiver 900 may also be employed to enable placement and positioning of the ball lenses 914A and 914B.

IV. Exemplary Lens Packages and Associated Ray Traces

Depending upon the particular application and/or optical effect desired to be achieved, embodiments of the invention employ a variety of different types of lens packages. With attention now to FIGS. 6A through 6D, further details are provided concerning some exemplary lens packages, and associated ray diagrams, as may be employed in connection with exemplary implementations of optical subassemblies and integrated optical transceivers disclosed herein. The illustrated lens packages are exemplary only however, and a wide variety of various other lens packages may be defined and employed as dictated by the requirements of a particular application.

In addition, the exemplary lens packages disclosed herein may be implemented as matched pairs in some cases or, alternatively, multiple different types of lens packages may be combined within, for example, a single integrated optical transceiver. Accordingly, the scope of the invention should not be construed to be limited to particular uses, types, or combinations of lens packages.

Figure 6A:
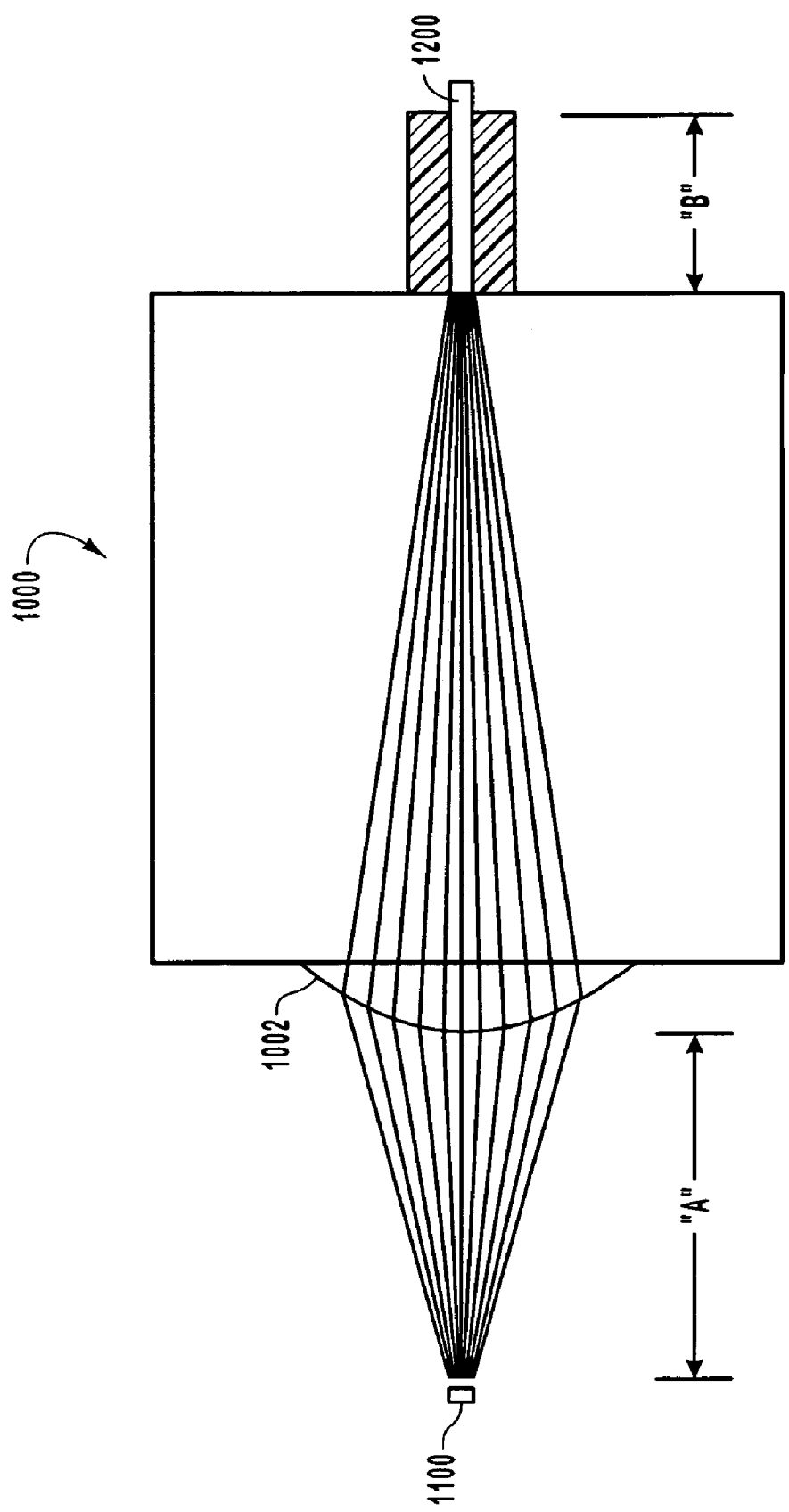
FIG. 6A is a ray diagram that indicates operational characteristics of an exemplary implementation of an optical subassembly such as that illustrated in FIG. 4.

In FIG. 6A, an exemplary lens package 1000 is shown that includes an aspheric lens 1002 configured and arranged for optical communication with an optical transmitter 1100 such as a VCSEL, or edge emitting laser such as an FP laser. At the other side of the lens package 1000, an optical fiber 1200 is positioned and arranged for optical communication with the aspheric lens 1002. In one exemplary implementation, the distance "A" from the optical transmitter 1100 to the outward most part of the aspheric lens 1002 is about 400 microns, while the distance "B" from the edge of the lens package 1000 to the fiber 1200 is about 100 microns. However, the foregoing, and other, dimensions concerning the geometry and arrangement of the lens package 1000 may be varied as required.

As indicated by the simplified ray diagram illustrated in FIG. 6A, the light emission pattern emitted by the optical transmitter 1100A is communicated to the aspheric lens 1002. As a result of the geometry and positioning of the aspheric lens 1002, the light passing into the aspheric lens 1002 is gathered and refocused by the aspheric lens 1002 to a point proximate the optical fiber 1200, generally as indicated.

Thus, in this exemplary lens package 1000, little or no collimation of the emitted light is performed, and the emitted light is simply gathered and refocused, by the aspheric lens 1002, at a desired position relative to the terminal point of the optical fiber 1200. As suggested in FIG. 6A, considerations such as the geometry and positioning of the aspheric lens 1002, as well as the positioning of the optical transmitter 1100A and optical fiber 1200, may be varied as necessary and, accordingly, the scope of the invention should not be construed to be limited to any particular configuration or arrangement of such components. In similar fashion, the thickness and other aspects of, the geometry of the lens package 1000 may be varied as well.

Moreover, the lens package 1000, as with other lens packages disclosed herein, is not limited for use solely on the "receive" side or solely on the "transmit" side of an optical subassembly or integrated optical transceiver. Thus, lens package 1000 may be employed in connection with incoming, as well as outgoing, optical signals. In such an arrangement, an optical signal exiting the fiber 1200 would be focused by aspheric lens 1002 into a suitable optical detector 1100B, such as a photodiode.

Figure 6B:
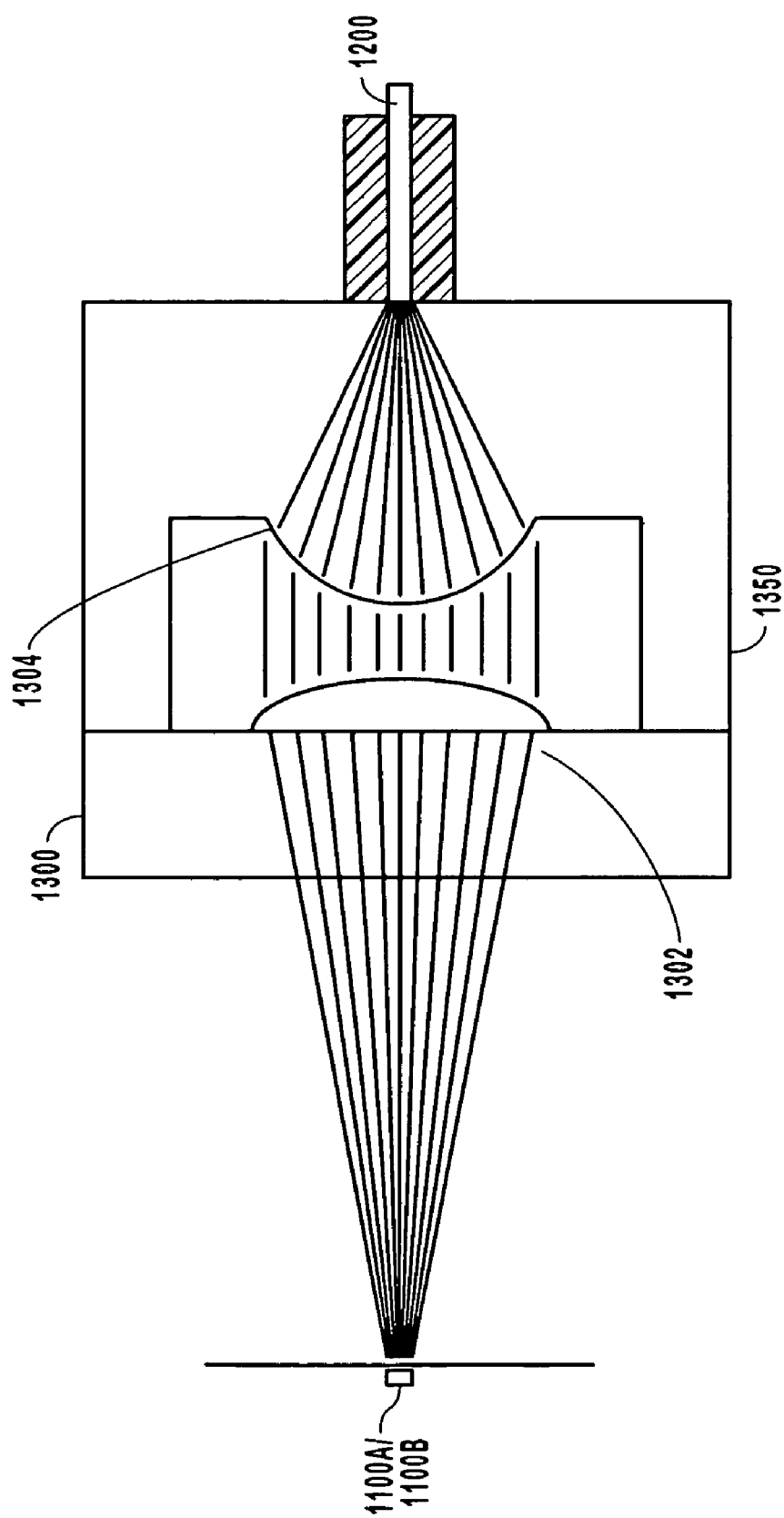
FIG. 6B is a ray diagram that indicates operational characteristics of an exemplary implementation of an optical subassembly such as that illustrated in FIG. 5A.

With attention now to FIG. 6B, aspects of another exemplary lens package, denoted generally at 1300, are indicated. The lens package 1300 is particularly well suited for long wave applications that involve the use of emitters 1100 such as FP lasers, but may be employed in other applications, and with other emitters, as well.

In the illustrated embodiment, the lens package 1300 includes an aspheric lens 1302. As well, a body 1350 of a fiber port that is attached to the lens package includes a second lens 1304, which may be implemented as a sphere or, alternatively, as an aspheric surface geometry (e.g., FIGS. 7 and 8) inside the port body 1350. As indicated, the second lens 1304 is integral with a portion of the body 1350 in some implementations, and is configured and arranged for optical communication with the collimating lens 1302 and the optical fiber 1200.

When the lens package 1300 is employed in a "transmit" path, the light pattern emitted by the optical transmitter 1100A is communicated to the collimating lens 1302. As a result of the geometry and positioning of the collimating lens 1302, the light passing into the collimating lens 1302 is collimated so that the light rays exiting the collimating lens 1302 and passing into the second lens 1304 are substantially parallel with each other within the gap between the two lenses. The second lens 1304 focuses the incoming light rays to a point proximate the end of the fiber 1200.

As with other lens packages disclosed herein, the lens package 1300, as well as the body 1350 of the fiber port, may be employed as well in a "receive" path. When thus employed, an optical signal received from the fiber 1200 is collimated by the lens 1304 within the structure 1350 first, and then passed to the aspheric lens 1302, which then focuses the light into a suitable optical detector 1100B.

Figure 6D:
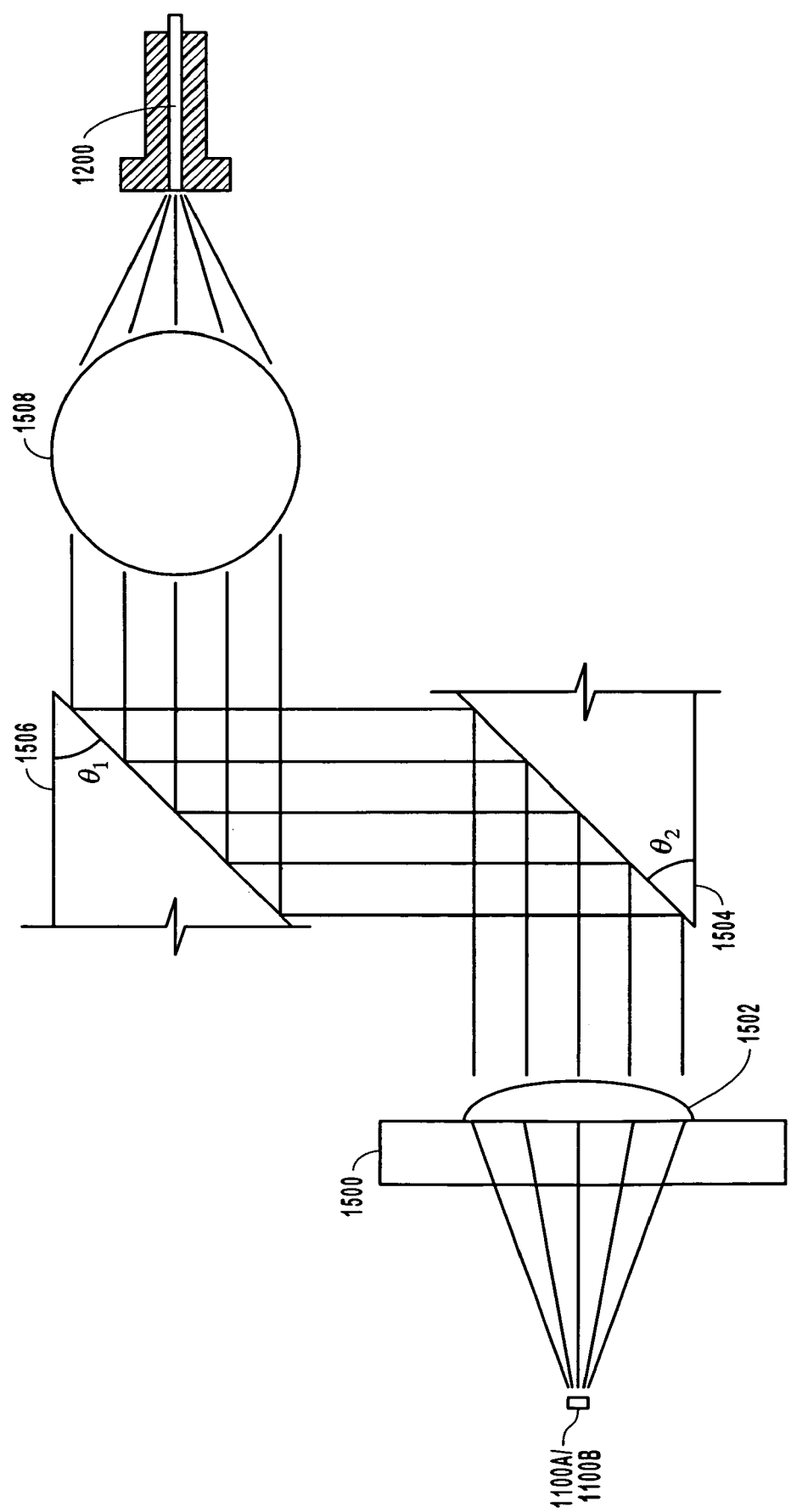
FIG. 6D is a ray diagram that indicates operational characteristics of an exemplary implementation of an optical subassembly such as that illustrated in FIG. 5C.

With attention now to FIGS. 6C and 6D, details are provided concerning some exemplary lens packages that employ various reflective elements, as well as lenses, to achieve desired optical effects. As noted earlier, lens packages such as those illustrated in FIGS. 6C and 6D may be employed in devices such as, but not limited to, the exemplary integrated optical transceivers illustrated in FIGS. 5B and 5C. As with the other exemplary lens packages disclosed herein, the lens packages illustrated in FIGS. 6C and 6D may be employed in either the "transmit" or the "receive" path of an optical subassembly or integrated optical transceiver.

With reference first to FIG. 6C, the illustrated lens package 1400 includes an aspheric lens 1402 configured to collect and collimate (or focus) an optical signal received from an optical transmitter 1100A, when the lens package 1400 is employed in a "transmit" path. The collimated or converging optical signal is then received at mirror 1404. The mirror 1404 redirects the optical signal toward mirror 1406 which, in turn, redirects the optical signal into the optical fiber 1200 in case of an already focused light, or, alternatively focuses the optical signal with its concave surface, such as in the case of collimated light. The mirrors 1404 and 1406 are, in at least some instances; implemented in connection with a housing portion of an integrated optical device (see, e.g., FIG. 5C).

As suggested in FIG. 6C, various optical effects, such as the focusing or collimation of an optical signal for example, may be achieved with mirrors 1404 and 1406, as well as other mirrors disclosed herein, by varying, for example, the position and/or orientation of the mirrors 1404 and 1406, as well as the particular type of mirror, such as a convex, concave, or substantially planar mirror. As well, more or fewer mirrors may be employed, consistent with the requirements of a particular application.

When the lens package 1400 is employed in the "receive" path, an optical signal from the fiber 1200 is collimated by mirror 1406 and the collimated signal directed to mirror 1404. The mirror 1404 then redirects the received collimated signal to the aspheric lens 1402 which focuses the signal before passing the signal on to a suitable optical detector 1100B.

Directing attention now to FIG. 6D, an alternative implementation of a lens package, denoted at 1500, is illustrated that includes an aspheric lens 1502. In addition to the lens package 1500, mirrors 1504 and 1506, and a ball lens 1508 are also provided. As with other embodiments of lens packages disclosed herein, the lens package 1500, as well as the mirrors 1504 and 1506, and the ball lens 1508, may be employed in either a "transmit" path or a "receive" path. When the lens package 1500 is employed in the "transmit" path, the signal generated by the optical emitter 1100A is collimated by aspheric lens 1502 and the collimated signal directed to mirror 1502. The mirror 1502 then redirects the signal to mirror 1504 which, in turn, redirects the signal again to the ball lens 1508. The ball lens 1508 focuses the received signal into the optical fiber 1200. As suggested in FIG. 6D, various optical effects may be achieved by modifying, among other things, one or both of the mirror angles "$\theta_1$" and "$\theta_2$".

When the lens package 1500 is employed in the "receive" path, an optical signal from the fiber 1200 is collimated by ball lens 1508 and directed to mirror 1506 which then redirects the collimated signal to mirror 1504. The mirror 1504 then redirects the received collimated signal to the aspheric lens 1502 which focuses the signal before passing the signal on to a suitable optical detector 1100B.

V. Exemplary Manufacturing Methods

Figure 7:
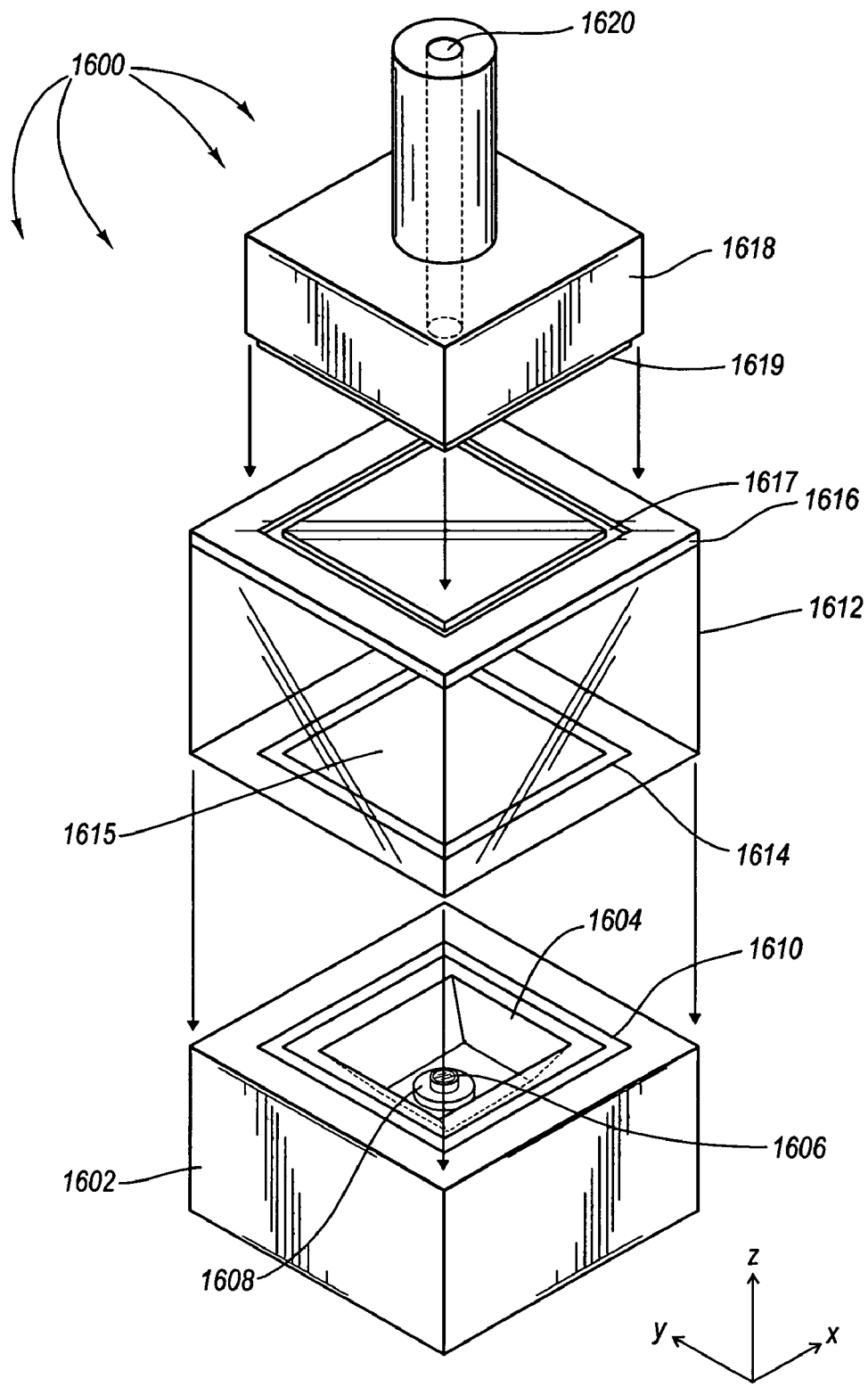
FIG. 7 is a perspective view of a laser assembly manufactured in accordance with a method of the present invention.

FIGS. 7 through 10 illustrate exemplary techniques for mass-producing the optical subassemblies ("OSA", such as a TOSA or ROSA) described herein. In particular, FIG. 7 illustrates an exploded view of an exemplary laser assembly 1600 in accordance with an implementation of the present invention, and which is similar in many respects to the hermetically sealed OSAs described in FIGS. 3 and 4, albeit showing an aspheric lens substrate 1612, having a lens surface 1615. (The illustrated lens surface 1615 can, however, be any type or degree of spherical or aspherical form.) FIG. 7 also represents at least one version of a hermetically sealed optical sub-assembly that can be manufactured using mass-production techniques. Where appropriate, one or more of the parts described in the following discussion may also include further reference to similar or identical parts in previous Figures, for purposes of convenience in illustration.

In general, a silicon substrate 1602 has a well 1604 (e.g., well 302A, FIG. 3) formed within it. The well 1604 is formed in one embodiment of the invention through a photolithographic wet-etch process. Other methods may also be used to form the well 1604. A laser 1606 (e.g., laser 308, FIG. 3) is disposed within the well 1604. The laser 1606 can be placed into the well as a discrete component. Alternate embodiments of the invention include the laser being formed by a semiconductor manufacturing process directly onto the silicon substrate 1602. Other viable methods may also be used to dispose the laser 1606 into the well 1604.

In some embodiments of the invention, a monitor photodiode 1608 (also, MPD 306/310, FIG. 3) can also be formed within the well 1604. The monitor photodiode 1608 can be used to actively control the output of the laser 1606. Namely, the monitor photodiode 1608 monitors the emissions of the laser 1606, and provides a source of feedback to a control circuit that controls the laser 1606. The monitor photodiode 1608 zoo got can be formed directly onto the silicon substrate 1602 through a semiconductor manufacturing process, such as photolithography. In other embodiments of the invention the monitor photodiode 1608 can be a discrete component placed in the well 1604. As previously described, the monitor photodiode 1608 can be used, for example, to measure and/or control the power of the laser 1606, as well as the wavelength output by the laser 1606. Any suitable method for disposing the monitor photodiode 1608 in the well 1604 can be used.

FIG. 7 also shows that the substrate silicon substrate 1602 is selectively coated as illustrated by a metallic coating 1610, which has geometries similar to a metallic coating 1614 of an etched, aspheric lens substrate 1612. The metallic coating 1610 surrounds the well 1604 in this example, and can be useful as a sealant, or for forming a hermetic seal. That is, the laser is hermetically-sealed between the substrate and the lens. The metallic coating 1610 in the example shown in FIG. 7 is formed to surround the well 1604. The metallic coating 1610 and 1614 can be performed during photolithographic processes that include steps for etching the aspheric lens substrate 1612 and the silicon substrate 1602.

The lens can also include an optical coating 1616. In one embodiment of the invention, the optical coating 1616 is an antireflective coating to reduce reflections of a light signal back into the laser 1606. The optical coating 1616 can also be a variable attenuation coating. The optical coating can be applied to either side of the lens. When fabricating the TOSA 1600, the lens substrate 1612 can be actively aligned with the laser 1606 to focus a beam from the laser into an appropriate path through lens surface 1615. Active alignment may involve activating the laser 1606 and adjusting the alignment of the lens surface 1615 of lens substrate 1612 and laser 1606 until a beam from the laser is properly focused by the lens. Thus, the planar geometries of the metallic coatings 1614 and 1610 should be such that a hermetic seal can be made for different alignments of the laser 1606 and the lens substrate 1612. The lens substrate 1612 and silicon substrate 1602 are then attached, in this example, by soldering the metallic coating 1610 on the silicon substrate 1602 to the metallic coating 1614 on the lens substrate 1612. This hermetically-seals the well with the laser 1606 inside.

Some embodiments of the invention also include a fiber interface part 1618 useful for interfacing a fiber stub with a beam from the laser, such that the beam from the laser can be propagated onto the fiber stub. The fiber interface part 1618 can be molded plastic or any other suitable material. The fiber interface part 1618 can be connected to the lens substrate 1612 using optical epoxy. The fiber interface part 1618 includes a receptacle 1620, (e.g., receptacle 500, FIG. 3) for receiving a fiber stub.

In accordance with still further embodiments of the invention, the fiber interface part 1618 includes a fiber stop 1619 (e.g., FIG. 8) formed on the molded part 1618 and positioned such that the input end of a fiber stub will rest at substantially the focal point of the glass lens 1615 in substrate 1612. This fiber stop can be useful in embodiments where the thickness and position of the laser 1606 is closely controlled. In other embodiments of the invention, a fiber stub placed in the receptacle 1620 is selectively movable to allow the input end of the fiber stub to be placed at the focal point of the lens surface 1615. This can be useful in cases where the laser 1606 varies in thickness from part to part. The fiber stub can then be epoxied into place in the receptacle 1620. In one embodiment of the invention, the fiber receptacle 1620 is a Small Form-factor Pluggable (SFP) receptacle.

As also shown in FIG. 7, the glass lens substrate 1612 can include an etched pit 1617 formed therein. Furthermore, the fiber interface part 1618 includes a protrusion 1619 formed onto the fiber interface part 1618, which corresponds geometrically to the etched pit 1617. This allows the fiber interface part 1618 to be appropriately aligned with the glass lens substrate 1612 when attaching the fiber interface part 1618, which can be a plastic molded part, to the lens. The fiber interface part is attached such that light from the laser 1606 can be directed into the input of a fiber stub in the receptacle 1620.

Figure 8:
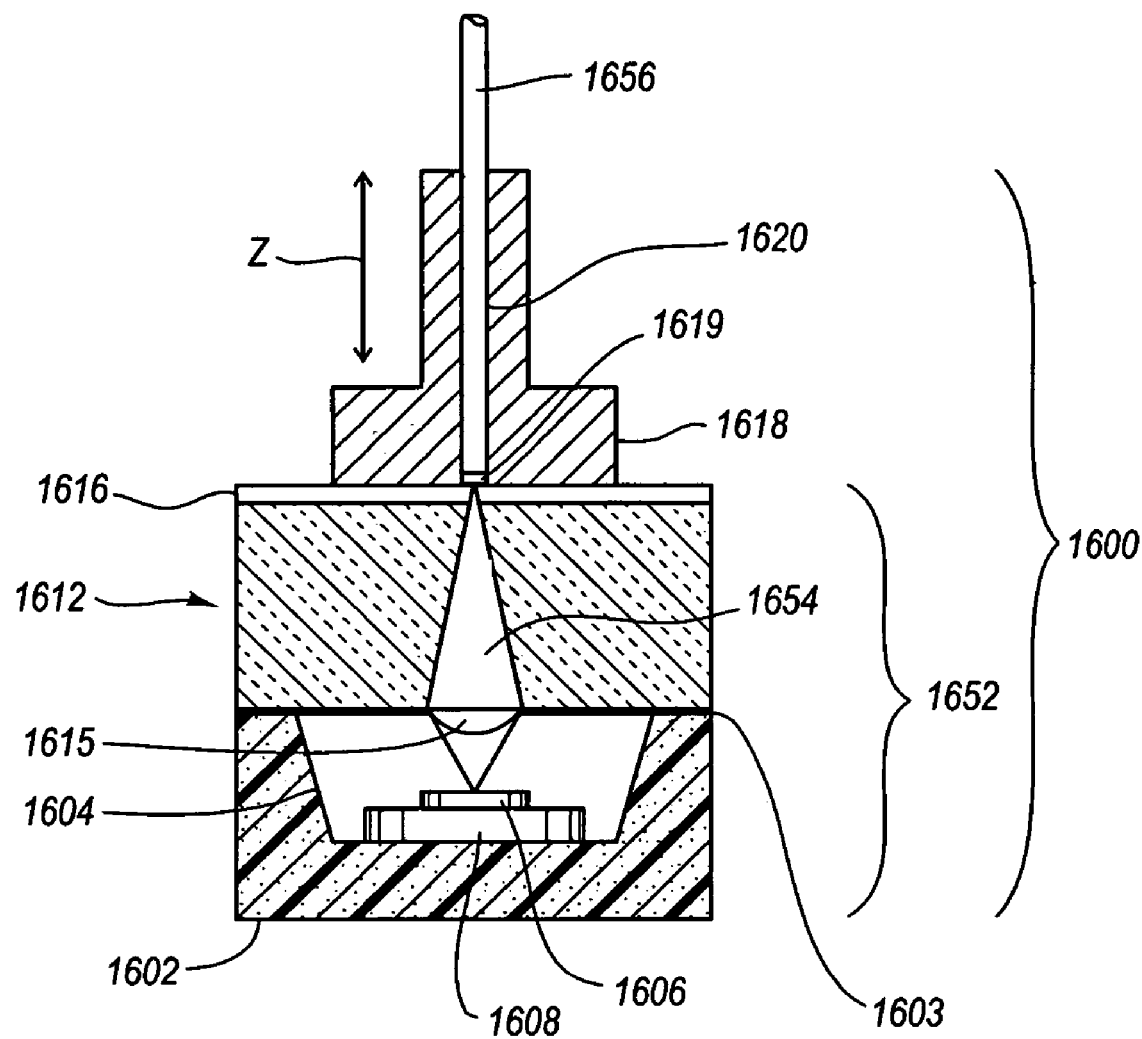
FIG. 8 is a cut-away view of the laser assembly illustrated in FIG. 7.

FIG. 8 illustrates a cutaway view of the transmitter optical subassembly 1600. Included within the transmitter optical subassembly 1600 is a hermetically-sealed laser assembly 1652, which includes the lens substrate 1612 and substrate 1604 in combination. The hermetically-sealed laser assembly 1652 emits a beam 1654 via the laser 1606. The beam 1654 travels through the lens substrate 1612, and ultimately into a fiber 1656, which is disposed in the receptacle 1620 of the fiber interface part 1618. The fiber 1656 can be selectively, and optimally, placed in the receptacle 1620 by selective movement along an axis perpendicular to the substrate 1604 (e.g., "Z axis"). The fiber 1656 can then be secured in place using epoxy or any other suitable fastening means.

In FIG. 8, a sealant means is implemented at an interface 1603, the sealant means being instrumental for hermetically-sealing the laser 1606 within the laser assembly 1652. In one example, the sealant means, hence the hermetic seal at the interface 1603, is formed by soldering a metallic coating 1614 (see FIG. 7) of the lens substrate 1612 to a metallic coating 1610 (see FIG. 7) of the silicon substrate 1602.

As previously described, the laser 1606 disclosed herein can be a vertical cavity surface emitting laser ("VCSEL") that emits the beam 1654 along the Z axis. Of course, other types of lasers or photo-generating components can be used in place of laser 1606, such as edge emitter lasers, or other photo-generating components appropriate for a specific application. In FIGS. 7 and 8, the laser 1606 is arranged such that the laser beam 1654 can be directed along the Z axis by reflecting the beam 1654 off one of the walls of the well 1604. Alternatively, when the beam 1654 is in a plane different from the Z axis, whether perpendicular or at some other angle (e.g., FIGS. 5B and 5C), the beam 1654 can be rotated into the Z axis by using a micro prism or other reflective elements. Generally, the present Figures and description relate primarily to using reflective elements, although a 45° micro prism (not shown) is used in at least one implementation.

Figure 9:
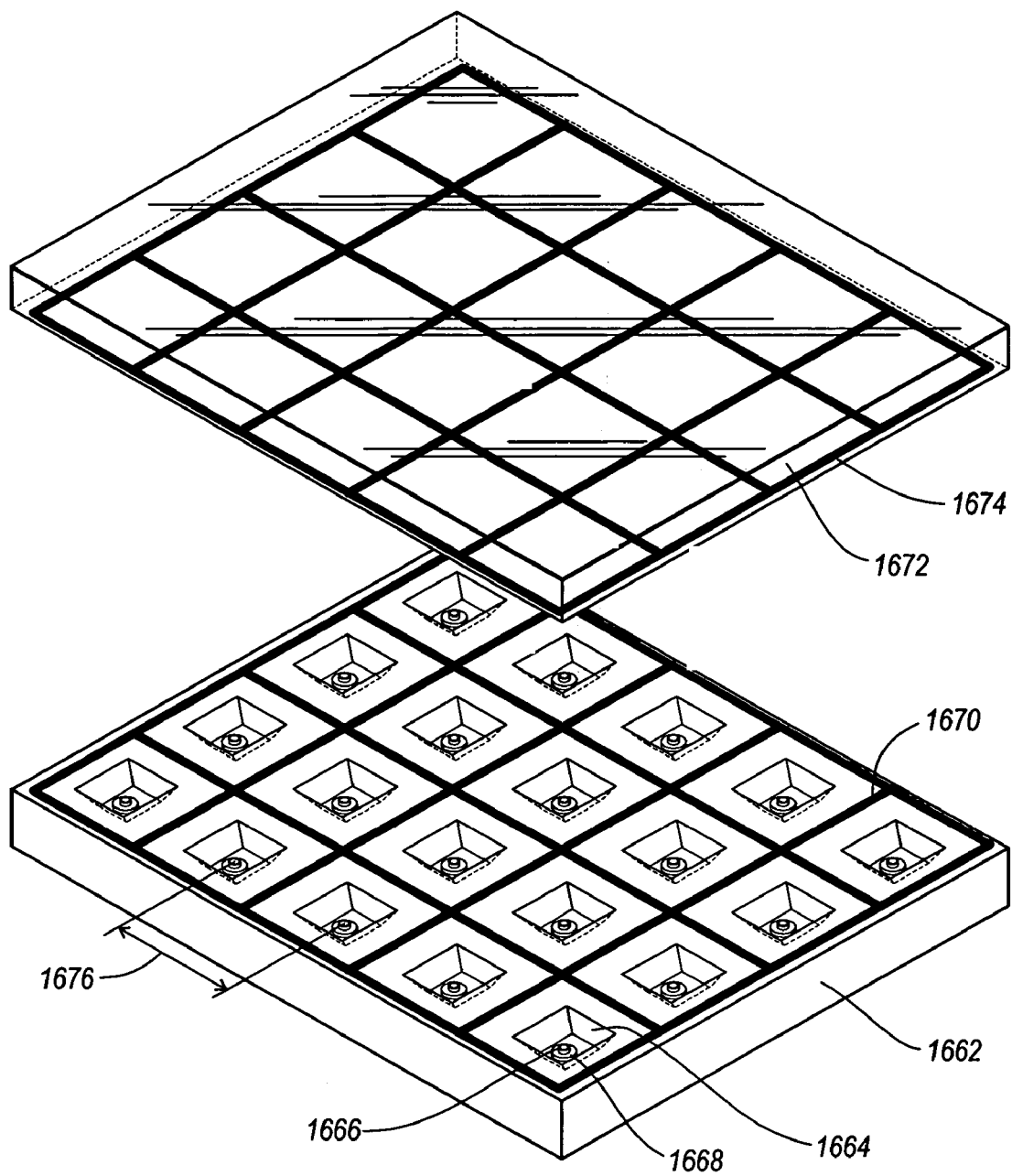
FIG. 9 is a perspective view of an array of laser components.
Figure 10:
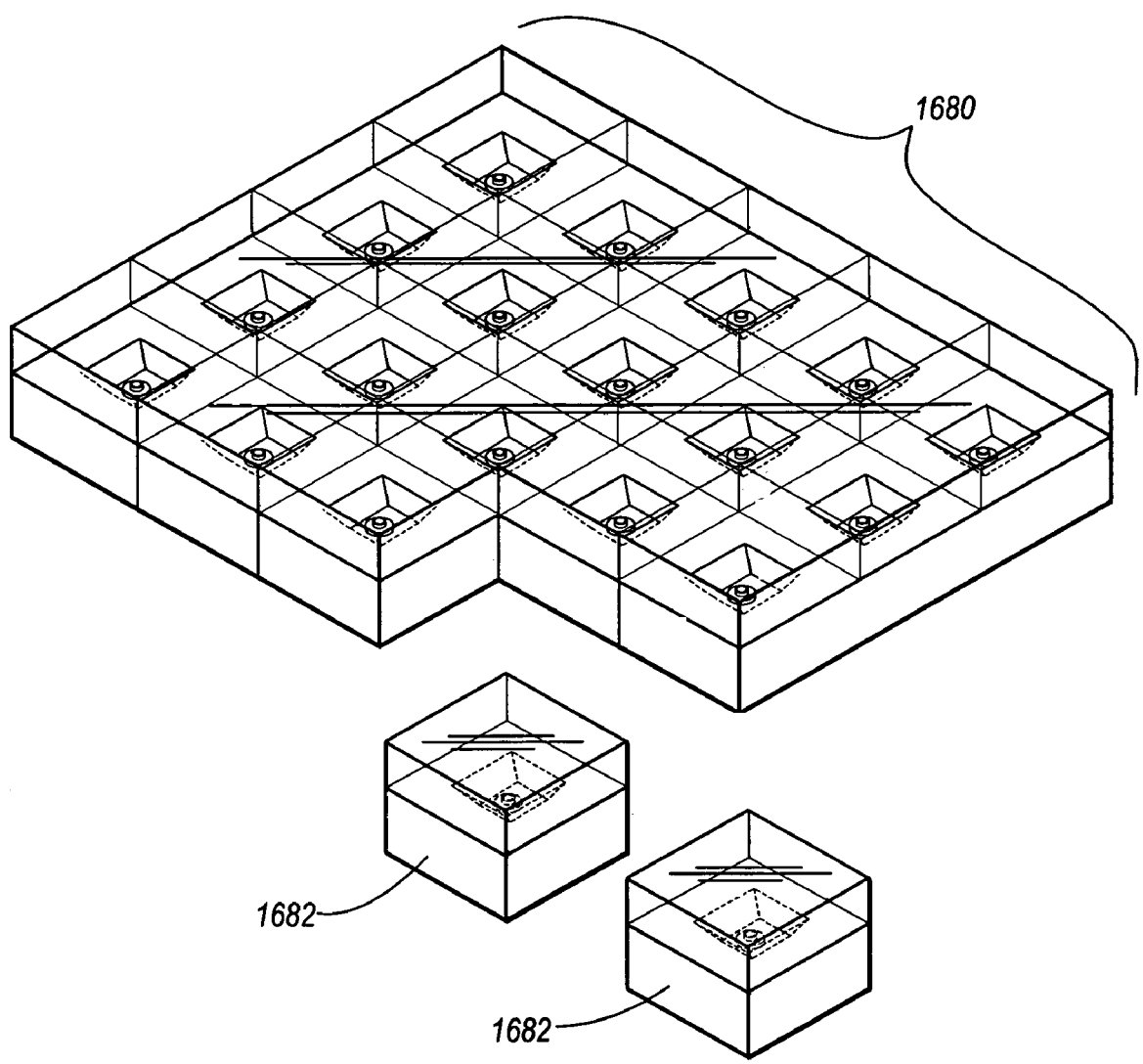
FIG. 10 illustrates a perspective view of discrete lasers formed from an array of laser components manufactured in accordance with methods of the present invention.
Figure 5C:
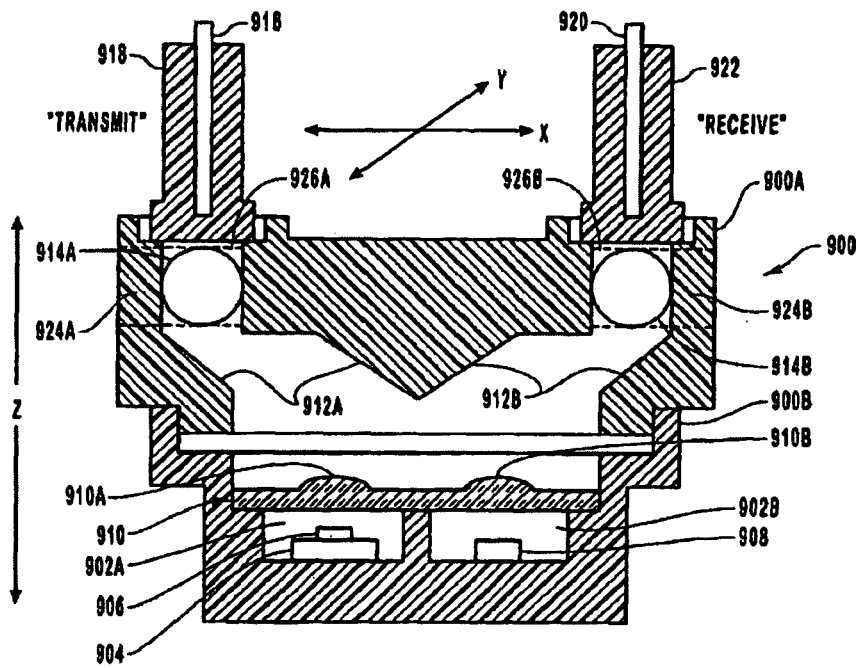
Figure 6A:
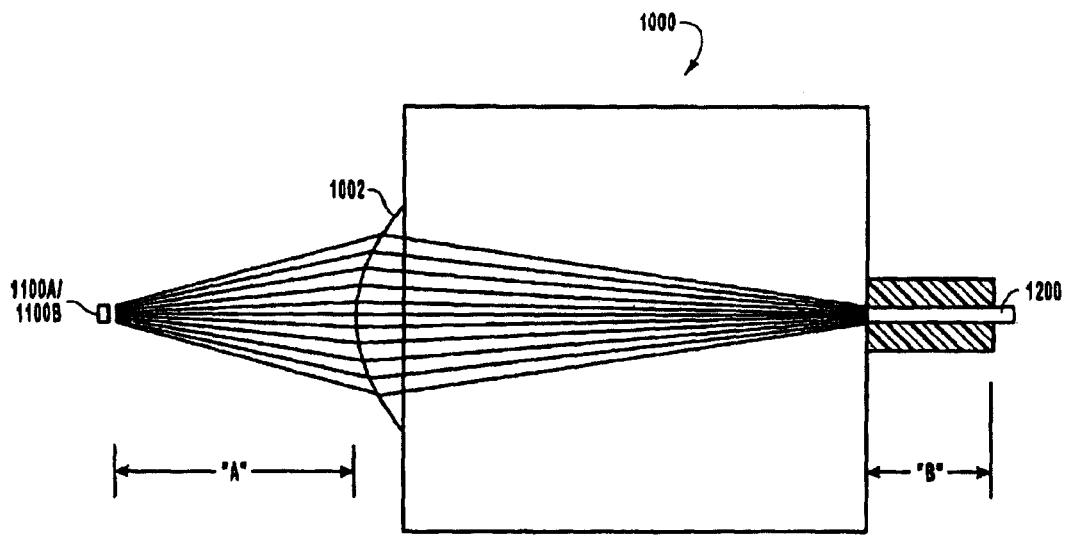

FIGS. 9 and 10, and the accompanying text, illustrate an exemplary method for making hermetically-sealed lasers. In particular, FIG. 9 shows a silicon substrate 1662, on which is formed a plurality of wells 1664. The wells 1664 can be formed through a wet-etch process, such as by using photolithography, or by any other appropriate method for constructing such wells 1664. Disposed within the wells 1664 are lasers 1666. Laser 1666 can be discrete components placed in the well 1664, or can be formed by a semiconductor manufacturing process or by any other suitable method. The lasers 1666 are placed at some predetermined distance 1676 from each other. The lasers 1666 can be placed using a "pick-and-place" machine, or any other suitable apparatus or process for placing the lasers 1666 within the well 1664. The distance 1676 between the lasers 1666 is closely controlled within some predetermined tolerance, such as, for example, a tolerance of 1 micron.

Monitor photodiodes 1668 can also be disposed in the wells 1664. The monitor diodes can also be discrete components or components made directly on the silicon substrate 1662. The monitor photodiodes 1668 can generate feedback signals used to control the wavelength and/or power emitted by the lasers 1666. This can be useful as the lasers 1666 age, causing changes in output, or when conditions in which the lasers 1666 are operating change resulting in a need for a change in the laser beam emitted, or for other reasons. Generally, FIG. 9 shows an array of hermetically sealed (or sealable) TOSAs, due to the placement of lasers inside the well. One will appreciate, however, that this illustration and description can also be easily modified for ROSAs, such as by substituting at least the laser with a photo-optical detector, such as an MPD. Other electrical components, such as a transimpedance amplifier ("TIA"), can also placed inside the well 1604 along with the detector in a ROSA. In addition, any passive electrical components, such as resistors and capacitors can also be integrated within the silicon substrate for further integration of the overall transceiver.

In any event, FIG. 9 shows that a lens array 1672 is actively aligned with the lasers 1666, attached to the silicon substrate 1662, and bonded to create an array of hermetically-sealed lasers. The lens array 1672 can be, for example, an etched, aspheric glass lens array where the position of the lens surfaces are lithographically located. The lens array 1672 can be formed using reactive ion etching or otherwise precise etching process, such that the lithographically located center points or optical axis of individual lenses in the lens array 1672 align with the lasers 1666. As such, all lasers can be appropriately aligned with the lens array 1672 at one time. As mentioned above, the lasers 1666 can be placed in the wells 1664 using a pick and place method with a 1 micron tolerance. This tolerance is sufficiently tight to allow fabrication of the entire lens array for attachment to the substrate 1662, yet at the same time ensure that lasers 1666 are focused by a corresponding lens of the array 1672.

As previously described, the hermetical seal can be formed in one embodiment of the invention by soldering the silicon substrate 1662 to the lens array 1672. The metal coatings 1674 and 1670 are such that the lasers 1666 can be aligned with the lens array 1672, and still provide sufficient overlap of the metal coatings 1674 and 1670 to hermetically-seal the lasers 1666 when the coatings 1674 and 1670 are soldered together. The array of hermetically-sealed lasers shown in FIG. 10 and designated generally as 1680 may then be cut into individual hermetically-sealed lasers, such as those illustrated and designated 1682. The hermetically-sealed laser can be mounted on a printed circuit board using conventional methods and techniques, such that an appropriate interface to the hermetically-sealed laser 1682 exists. One interface that can be used is the fiber interface part 1618 shown in FIG. 7.

Accordingly, hermetically-sealed lasers in accordance with the present invention can be fabricated, particularly with efficient, mass-production techniques, without the need to encapsulate the laser in a TO can, or other bulky packaging. This form of manufacturing hermetically sealed laser packages using parallel manufacturing techniques can also be applied with wafer scale burn-in, and other testing procedures of the lasers. In particular, the automated align and sealing method described herein makes automated assembly, and test of hermetically laser packages, possible without necessarily requiring additional human handling. This can in turn eliminate potential damage hazard to the laser due to inadvertent electrostatic discharge.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. An optical subassembly for fiber optic communications, comprising:
    a substrate;
    at least one optical component mounted directly to the substrate, the at least one optical component comprising one of an optical emitter and a optical detector; and
    a lens package including a lens that is optically coupled with the at least one optical component, the lens package cooperating with the substrate to substantially define a hermetic chamber within which the at least one optical component is disposed;
    a fiber port attached at least indirectly to the lens package; and
    means for facilitating X-Y positioning of the lens package and the fiber port relative to each other.

2. The optical subassembly as recited in claim 1, wherein the lens comprises an aspheric lens.

3. The optical subassembly as recited in claim 1, wherein the lens is configured to collimate or to focus an optical signal to or from the at least one optical element.

4. The optical subassembly as recited in claim 1, wherein the substrate substantially comprises one of ceramic, plastic, or glass.

5. The optical subassembly as recited in claim 1, wherein the optical subassembly is configured for use with one of an LC connector and an SC connector.

6. The optical subassembly as recited in claim 1, wherein the substrate defines at least one well wherein the at least one optical component is disposed.

7. The optical subassembly as recited in claim 1, wherein the optical emitter is one of an edge emitting laser and a VCSEL; and wherein the optical detector is a photodiode.

8. The optical subassembly as recited in claim 1, further comprising means for facilitating X-Y positioning of the lens package and the substrate relative to each other prior to forming a hermetic seal.

9. The optical subassembly as recited in claim 1, wherein the at least one optical component comprises an optical emitter, the device further comprising a monitor photodiode located proximate the optical emitter.

10. The optical subassembly as recited in claim 1, wherein the at least one optical component emits or detects light within the hermetic chamber within which the at least one optical component is disposed.

11. An integrated optical transceiver, comprising:
    a lower housing having first and second hermetic chambers, wherein the first hermetic chamber includes at least an optical emitter or an optical detector and the second hermetic chamber includes at least an optical emitter or an optical detector, the optical emitter or the optical detector in the first hermetic chamber and the second hermetic chamber being mounted in communication with a lens package, the lower housing further defining a socket;
    an upper housing defining a neck portion configured to be slidingly received in the socket, such that the upper housing is configured for Z axis adjustment relative to the lower housing; and
    a transmit fiber port and a receive fiber port configured for X-Y axis adjustment relative to the upper housing.

12. The integrated optical transceiver as recited in claim 11, wherein the optical emitter comprises one of an edge emitting laser and a VCSEL.

13. The integrated optical transceiver as recited in claim 11, wherein the lens package comprises a first lens configured to collimate an optical signal transmitted by the optical emitter, and a second lens configured to focus a collimated signal into the optical detector.

14. The integrated optical transceiver as recited in claim 13, wherein at least one of the first and second lenses comprises an aspheric lens.

15. The integrated optical transceiver as recited in claim 13, further comprising:
a third lens being interposed between the first lens and the transmit fiber port; and
a fourth lens being interposed between the second lens and the receive fiber port;
wherein at least one of the third and fourth lenses comprises at least a portion of a sphere.

16. The integrated optical transceiver as recited in claim 11, wherein the integrated optical transceiver is configured for surface mounting.

17. The integrated optical transceiver as recited in claim 11, wherein the hermetic chamber comprises first and second hermetic chambers in communication with each other.

18. The integrated optical transceiver as recited in claim 11, further comprising:
a monitor photodiode located proximate the optical emitter; and
an electrical connector in communication with at least one of the optical emitter and the optical detector.

19. The integrated optical transceiver as recited in claim 11, wherein the lens package cooperates with the lower housing to substantially define both the first and second hermetic chambers.

20. The integrated optical transceiver as recited in claim 11, wherein the lens package is a single component having multiple lenses disposed therein.

21. The integrated optical transceiver as recited in claim 11, wherein at least a portion of the transmit fiber port and a portion of the receive fiber port extend outside of the upper housing.

22. The integrated optical transceiver as recited in claim 11, wherein the transmit fiber port and the receive fiber port are configured to be adjustably positioned within a transmit gap or a receive gap formed in an outside surface of the upper housing.

23. A method of making a hermetically-sealed laser assembly, the method comprising:
wet-etching a wafer to form a well therein;
disposing a laser in the well;
aligning an aspheric glass lens with the laser;
sealing the glass lens about the well, such that the well and glass lens form a hermetic seal with the laser disposed there between; and
applying a variable attenuation coating on the glass lens.

24. The method of claim 23, wherein sealing the glass lens about the well further comprises selectively coating a portion of the wafer surrounding the well with metal; selectively coating a portion of a glass lens with metal; and soldering the glass lens to the wafer at the metal coatings of the wafer and the glass lens.

25. The method of claim 23, wherein disposing a laser in the well further comprises placing an edge emitter laser in the well, such that a surface of the well reflects a beam from the edge emitter laser into a micro prism.

26. The method of claim 23, further comprising attaching a plastic molded part to the lens.

27. The method of claim 26, further comprising forming pits in the glass lens, and forming protrusions on the plastic molded part, wherein the pits and the protrusions are reciprocally configured for alignment.

28. The method of claim 26, further comprising forming a fiber stop on the molded part for stopping a fiber stub, such that an input end of the fiber stub is stopped at a focal point of the glass lens.

29. The method of claim 23, wherein a laser is disposed in a hermetically sealed chamber defined by the well and glass lens.

30. An integrated optical transceiver, comprising:
a lower housing having first and second hermetic chambers, wherein the first and second hermetic chamber includes at least an optical emitter or a optical detector mounted in communication with a lens package, the lower housing further defining a socket;
an upper housing defining a neck portion configured to be slidingly received in the socket, such that the upper housing is configured for Z axis adjustment relative to the lower housing; and
a transmit fiber port and a receive fiber port configured for X-Y axis adjustment relative to the upper housing;
wherein the lens package comprises a first lens configured to collimate an optical signal transmitted by the optical emitter, and a second lens configured to focus a collimated signal into the optical detector.

31. The integrated optical transceiver as recited in claim 30, wherein at least one of the first and second lenses comprises an aspheric lens.

32. The integrated optical transceiver as recited in claim 30, further comprising:
a third lens being interposed between the first lens and the transmit fiber port; and
a fourth lens being interposed between the second lens and the receive fiber port;
wherein at least one of the third and fourth lenses comprises at least a portion of a sphere.

33. A method of making a hermetically-sealed laser assembly, the method comprising:
wet-etching a wafer to form a well therein;
disposing a laser in the well;
aligning an aspheric glass lens with the laser;
sealing the glass lens about the well, such that the well and glass lens form a hermetic seal with the laser disposed there between;
attaching a plastic molded part to the lens; and
forming pits in the glass lens, and forming protrusions on the plastic molded part, wherein the pits and the protrusions are reciprocally configured for alignment.

34. A method of making a hermetically-sealed laser assembly, the method comprising:
wet-etching a wafer to form a well therein;
disposing a laser in the well;
aligning an aspheric glass lens with the laser;
sealing the glass lens about the well, such that the well and glass lens form a hermetic seal with the laser disposed there between;
attaching a plastic molded part to the lens; and
forming a fiber stop on the molded part for stopping a fiber stub, such that an input end of the fiber stub is stopped at a focal point of the glass lens.

* * * * *

UNITED STATES PATENT AND TRADEMARK OFFICE
CERTIFICATE OF CORRECTION

PATENT NO.        : 7,309,174 B2
APPLICATION NO. : 11/116639
DATED             : December 18, 2007
INVENTOR(S)       : Mina Farr It is certified that error appears in the above-identified patent and that said Letters Patent is hereby corrected as shown below:

Drawings
Replace Figure 5A with the figure depicted below, wherein the integrated transceiver 600 mentioned in the text is included

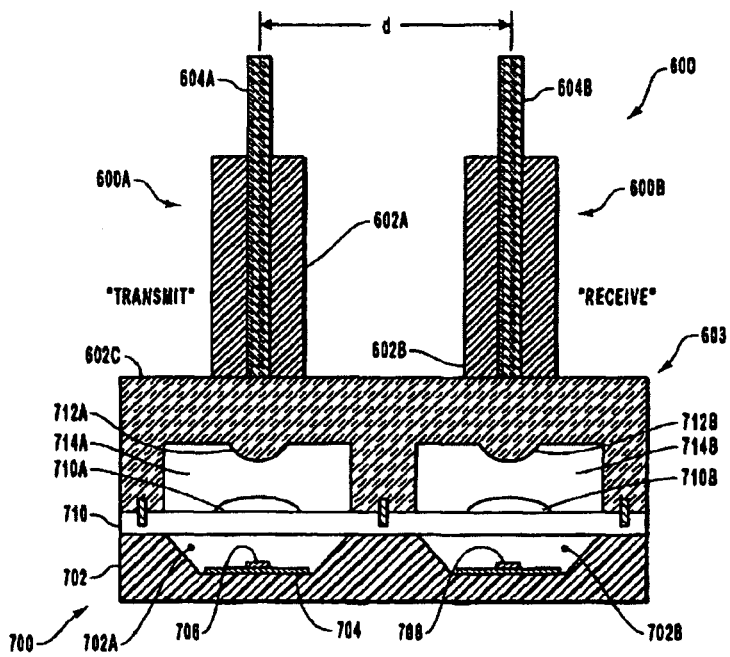

FIG. 5A

Signed and Sealed this

Twelfth Day of October, 2010

David J. Kappos
*Director of the United States Patent and Trademark Office*

Replace Figure 5C with the figure depicted below, wherein the integrated transceiver 900 mentioned in the text is included Replace Figure 6A with the figure depicted below, wherein the optical transmitter 1100A and optical detector 1100B mentioned in the text is included

CERTIFICATE OF CORRECTION (continued)
U.S. Pat. No. 7,309,174 B2

Replace Figure 7 with the figure depicted below, wherein the protrusion 1619 is relabeled as 1621

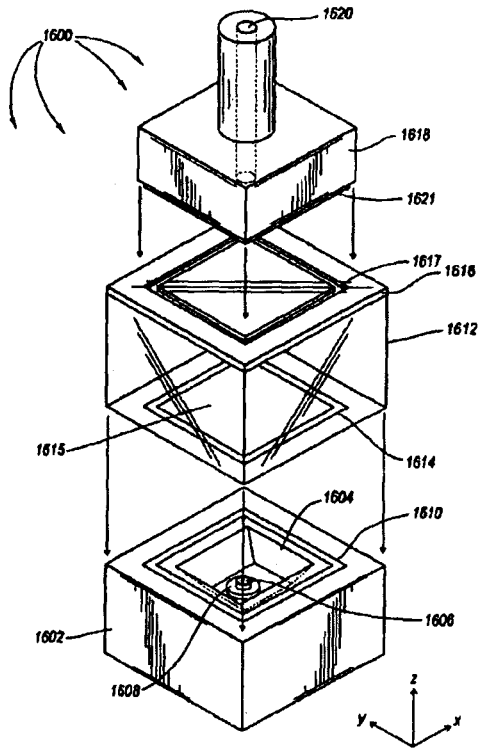

Fig. 7

Column 2
Line 54, change "lens" to --window--

Column 5
Line 1, change "("VCSEL")," to --("VCSEL") and--
Line 39, change "environment 100" to --environment--
Line 44, change "transceiver is" to --transceiver 100 is--

Column 6
Line 18, change "optical subassemblies 100," to --optical subassemblies,--
Line 22, change "optical subassemblies 100" to --optical subassemblies--
Line 48, change "FIG. 1," to --FIG. 2,--

Column 7
Line 26, change "200 is particular" to --302 is particularly--

Column 8
Line 58, change "100" to --200--

Column 9
Line 8, change "100" to --200--

Column 10
Line 17, change "100" to --200--
Line 20, change "100" to --200--
Line 34, change "200" to --300--

Column 11
Line 12, change "exemplary transceiver" to --exemplary transceiver 100--

Column 12
Line 14, delete ""(see, e.g., FIG. 7B)."

Column 13
Line 34, change "incoming and outgoing" to --outgoing and incoming--
Line 65, change "900." to --800.--

Column 14
Line 2, change "900." to --800.--
Line 18, change "822" to --824--

Column 16
Line 23, change "1100" to --1100A--
Line 28, change "1100" to --1100A--

Column 17
Line 1, change "1100" to --1100A--

Column 18
Line 66, change "1608 zoo got can" to --1608 can--

Column 19
Line 15, change "the laser" to --the laser 1606--
Line 16, change "substrate and the lens" to --substrate 1602 and the lens--
Line 41, change "the well" to --the well 1604--
Line 49, change "(e.g., receptacle 500" to --(e.g., receptacle for optical fiber 500--

Column 20
Line 1, change "1619" to --1621--
Line 13, change "substrate 1604" to --silicon substrate 1602--
Line 21, change "substrate 1604" to --silicon substrate 1602--

Column 21
Line 14, change "1604" to --1664--
Line 47, change "sealed laser" to --sealed laser 1682--

Column 23
Line 61, remove carriage return after "metal"